(12) United States Patent
Lemieux

(10) Patent No.: US 11,499,477 B2
(45) Date of Patent: Nov. 15, 2022

(54) SYSTEM, METHOD AND APPARATUS FOR IMPROVING GAS TURBINE PERFORMANCE WITH COMPRESSED AIR ENERGY STORAGE

(71) Applicant: Cal Poly Corporation, San Luis Obispo, CA (US)

(72) Inventor: Patrick J. E. Lemieux, San Luis Obispo, CA (US)

(*) Notice: Subject to any disclaimer, the term of this patent is extended or adjusted under 35 U.S.C. 154(b) by 1291 days.

(21) Appl. No.: 15/408,785

(22) Filed: Jan. 18, 2017

(65) Prior Publication Data

US 2017/0254265 A1 Sep. 7, 2017

Related U.S. Application Data

(60) Provisional application No. 62/302,672, filed on Mar. 2, 2016.

(51) Int. Cl.
| | |
|---|---|
| *F02C 6/06* | (2006.01) |
| *F02C 6/16* | (2006.01) |
| *F02C 7/18* | (2006.01) |
| *F02C 7/141* | (2006.01) |

(52) U.S. Cl.
CPC ............. *F02C 6/16* (2013.01); *F02C 6/06* (2013.01); *F02C 7/141* (2013.01); *F02C 7/18* (2013.01); *F05D 2260/213* (2013.01); *F05D 2260/232* (2013.01)

(58) Field of Classification Search
CPC .................................... F02C 6/14; F02C 6/16
See application file for complete search history.

(56) References Cited

U.S. PATENT DOCUMENTS

| | | | | |
|---|---|---|---|---|
| 4,885,912 A | * | 12/1989 | Nakhamkin | ........... F02C 1/06 60/659 |
| 5,934,063 A | * | 8/1999 | Nakhamkin | ........... F02C 6/16 60/773 |
| 6,158,217 A | | 12/2000 | Wang | |
| 6,273,076 B1 | | 8/2001 | Beck et al. | |
| 6,283,410 B1 | | 9/2001 | Thompson | |
| 7,325,401 B1 | * | 2/2008 | Kesseli | ........... F02C 1/05 60/677 |
| 2010/0251712 A1 | * | 10/2010 | Nakhamkin | ........... F02C 6/16 60/659 |

OTHER PUBLICATIONS

GE Power Systems, Gas Turbine and Combined Cycle Products, Mar. 2003, p. 13. (Year: 2003).*
R.C. Stancliff, "The General Electric LM5000 Marine Gas Turbine," in International Gas Turbine Conference, 1989.

(Continued)

*Primary Examiner* — Todd E Manahan
*Assistant Examiner* — Marc J Amar

(57) ABSTRACT

A system and method of increasing efficiency and power output of a gas turbine system using a compressed air storage system including delivering a compressed air charge from the compressed air storage system, the compressed air charge having a pressure greater than ambient pressure and a temperature less than ambient temperature, the compressed air charge being delivered to the gas turbine and the compressed air charge operable to cool at least a portion of the gas turbine.

6 Claims, 19 Drawing Sheets

(56) References Cited

OTHER PUBLICATIONS

J.B. Burnham, M.H. Giuiliani and D.J. Moeller, "Development, Installation, and Operating Results of a Steam Injection System (STIG) in a General Electric LM5000 Gas Generator," Journal of Engineering for Gas Turbines and Power, vol. 109, No. 2, 1987.
D.J. Moeller and D.A. Kolp, "Simpson Paper Co.: First 35MW IM5000 in Cogeneration Plant," in ASME International Gas Turbine conference 84-GT-55, 1984.
D. Lew, D. Piwko, N. Miller, G. Jordan, K. Clark and L. Freeman, "How do High Levels of Wind and Solar Impact the Grid? The Western Wind and Solar Study," NREL Technical Report TP-5500-50057, 2010.
"History of First U.S. Compressed Air Energy Storage (CAES) Plant (110 MW 26h): Volume 2: Construction," EPRI Technical Report TR-101751-V2, 1994.
N.M. Jubeh and Y.S.F. Najjar, "Power Augmentation with CAES (Compressed Air Energy Storage) by Air Injection or Supercharging Makes Environment Greener," Energy, vol. 38, 2012.
D.A. Kolp and D.J. Moeller, "World's First Full STIG LM5000 Installed at Simpson Paper Company," ASME Journal of Engineering for Gas Turbines and Power, vol. 111, No. 2, 1989.
E.W. Lemmon, R.T. Jacobsen, S.G. Penoncello and D. Friend, "Thermodynamic Properties of Air and Mixtures of Nitrogen, Argon and Oxygen from 60 to 2000 K at Pressures to 2000 MPa," Journal of Physical and Chemical Reference Data, vol. 29, No. 3, 2000.
X. Luo and J. Wang, "Overview of Current Development on Compressed Air Energy Storage," European Energy Research Alliance, 2003.
"energystorageexchange.org," [Online]. Available: http://www.energystorageexchange.org/projects/136. [Accessed Jun. 2016].
"vbr-turbinepartners.com," [Online]. Available: http://www.vbr-turbinepartners.com/gas-turbine-spare-parts/general-electric-ge-lm5000-information/. [Accessed Jun. 2016].
"kitmondo.com," 2016. [Online], Available: https://www.kitmondo.com/ge-ge-lm5000-32mw/ref471605. [Accessed Jun. 2016].
"greentechmedia.com," 2014. [Online]. Available: http://www.greentechmedia.com/articles/read/Layoffs-at-Lightsail-Khosla-Funded-Compressed-Air-Energy-Storage-Startup. [Accessed Jun. 2016].
C. Bessey and R. Mendelssohn, "An Analysis of North Pacific Subsurface Temperatures Using State-Space Techniques," Cornell University Technical Report, eprint arXiv:1204.2515, 2012.
"greentechmedia.com," 2015. [Online]. Available: http://www.greentechmedia.com/articles/read/sustainx-to-merge-with-general-compression-abandon-above-ground-caes-ambiti. [Accessed Jun. 2016].
"greentechmedia.com," 2013. [Online]. Available: http://www.greentechmedia.com/articles/read/texas-calls-for-317mw-of-compressed-air-energy-storage2. [Accessed Jun. 2016].
H. Safaei, D.W. Keith, R.J. Hugo, "Compressed air energy storage (CAES) with compressors distributed at heat loads to enable waste heat utilization," in Journal of Applied Energy 103 (2013) 165-179.
A. Rogers, A. Henderson, X. Wang and M. Negnevitsky, "Compressed Air Energy Storage: Thermodynamic and Economic Review," in IEEE 978-1-4799-6415-4/14 2014.
B. Belaissaoui, G. Cabot, M.S. Cabot, D. Willson and E. Favre, "An energetic analysis of CO2 capture on a gas turbine combining flue gas recirculation and membrane separation," in Journal of Energy 38 (2012) 167-175, www.elsevier.com/locate/energy, Jan. 24, 2012.
Z. Song, T. Shi, C. Xia and W. Chen "A novel adaptive control scheme for dynamic performance improvement of DFIG-Based wind turbines," in Journal of Energy 38 (2012) 104-117, www.elsevier.com/locate/energy, Jan. 25, 2012.
J.B. Greenblatta, S. Succarb, D.C. Denkenberger, R.H. Williams, R.H. Socolow, "Baseload wind energy: modeling the competition between gas turbines and compressed air energy storage for supplemental generation," in Energy Policy 35 (2007) 1474-1492, Jun. 9, 2006.
N. Hartmann, O. Vohringer, C. Kruck and L. Eltrop, "Simulation and analysis of different adiabatic Compressed Air Energy Storage plant configurations," in Applied Energy 93 (2012) 541-548, www.elsevier.com/locate/apenergy, Dec. 27, 2011.
S. Soimakallio, L. Saikku, "CO2 emissions attributed to annual average electricity consumption in OECD (the Organisation for Economic Co-operation and Development) countries," in Journal of Energy 38 (2012) 13-20, www.elsevier.com/locate/energy, Jan. 26, 2012.
Jing Li, Gang Pei, Yunzhu Li, Dongyue Wang, Jie Ji, "Energetic and exergetic investigation of an organic Rankine cycle at different heat source temperatures," in Journal of Energy 38 (2012) 85-95, www.elsevier.com/locate/energy, Jan. 16, 2012.
Zhongguang Fu, Ke Lu and Yiming Zhu, "Thermal System Analysis and Optimization of Large-Scale Compressed Air Energy Storage (CAES)," in www.mdpi.com/journal/energies, Energies 2015, 8, 8873-8886; doi:10.3390/en8088873, Aug. 21, 2015.
R. Schaeffer, A.S. Szklo, A.F. Pereira de Lucena, B. Soares, M.C. Borba, L..Pinheiro, P. Nogueira, F.P. Fleming, A. Troccoli, M. Harrison, M.S. Boulahya, "Energy sector vulnerability to climate change: A review," in Journal of Energy 38 (2012) 1-12, www.elsevier.com/locate/energy, Dec. 24, 2011.
Wen-Long Cheng, Yong-Hua Huang, Na Liu and Ran Ma, "Estimation of geological formation thermal conductivity by using stochastic approximation method based on well-log temperature data," in Journal of Energy 38 (2012) 21-30, vww.elsevier.com/locate/energy, Jan. 24, 2012.
Ali Kianifar, Saeed Zeinali Heris, Omid Mahian, "Exergy and economic analysis of a pyramid-shaped solar water purification system: Active and passive cases," in Journal of Energy 38 (2012) 31-36, www.elsevier.com/locate/energy, Jan. 24, 2012.
Xin Wang, Hongguang Zhang, Baofeng Yao, Yan Lei, Xiaona Sun, Daojing Wang and Yunshan Ge, "Experimental study on factors affecting lean combustion limit of S.I engine fueled with compressed natural gas and hydrogen blends" in Journal of Energy 38 (2012) 58-65, www.elsevier.com/locate/energy, Jan. 21, 2012.
Haixiang Zang, Qingshan Xu and Haihong Bian, "Generation of typical solar radiation data for different climates of China," in Journal of Energy 38 (2012) 236-248, www.elsevier.com/locate/energy, Dec. 30, 2011.
S. Kumar, O. Singh, "Effect of Gas/Steam Turbine Inlet Temperatures on Combined Cycle Having Air Transpiration Cooled Gas Turbine," J. Inst. Eng. India Ser. C (Oct.-Dec. 2012) 93(4):297-305, DOI 10.1007/s40032-012-0046-9.
Eliza Strickland, "How to store renewable energy for later," Sierra Club, viewed online http://www.sierraclub.org/sierra/2015-5-september-october/innovate/how, Aug. 10, 2015.
Baicheng Weng, Zhu Wu, Zhilin Li, Hui Yang, "Hydrogen generation from hydrolysis of MNH2BH3 and NH3BH3/MH (M¼ Li, Na) for fuel cells based unmanned submarine vehicles application," in Journal of Energy 38 (2012) 205-211, www.elsevier.com/locate/energy, Jan. 26, 2012.
Daniella Johansson, Per-Åke Franck, Thore Berntsson, "Hydrogen production from biomass gasification in the oil refining industry—A system analysis," in Journal of Energy 38 (2012) 212-227, www.elsevier.com/locate/energy, Jan. 24, 2012.
Kang-Shin Chen, Yuan-Chung Lin, Kuo-Hsiang Hsu, Hsin-Kai Wang, "Improving biodiesel yields from waste cooking oil by using sodium methoxide and a microwave heating system," in Journal of Energy 38 (2012) 151-156, www.elsevier.com/locate/energy, Jan. 10, 2012.
H. Ibrahim, Karim Belmokhtara, Mazen Ghandour "Investigation of Usage of Compressed Air Energy Storage for Power Generation System Improving—Application in a Microgrid Integrating Wind Energy" Article in Energy Procedia—Jun. 2015, DOI: 10.1016/j.egypro.2015.07.694, 9th International Renewable Energy Storage Conference, IRES 2015, https://www.researchgate.net/publication/282515248.
Johann Karkheck, "Compressed Energy Air Storage" power point presentation received by the Inventor on or before Jun. 17, 2016.
Robert Boozer, "Gas Turbine Basic Familriazation LM2500, TM2500, LM5000, LM6000, and LMS100 Gas Turbine Engines,". . . PUB Where and When.
"LM6000 Gas Turbine (50 Hz)" factsheet from GE Power available on line at www.gepower.com.

(56) References Cited

OTHER PUBLICATIONS

Enzo Zanchini, Stefano Lazzari, Antonella Priarone, "Long-term performance of large borehole heat exchanger fields with unbalanced seasonal loads and groundwater flow," in Journal of Energy 38 (2012) 66-77, www.elsevier.com/locate/energy, Jan. 24, 2012.

Hussam Zebian, Marco Gazzino, Alexander Mitsos, "Multi-variable optimization of pressurized oxy-coal combustion," in www.elsevier.com/locate/energy, Jan. 23, 2012.

Dr. Michael Nakhamkin, Director, Chief Technology Officer, Madhukar Chiruvolu, Director of Engineering Energy Storage and Power Corporation (ESPC), Chan Daniel VP Business Development Towngas International Company Ltd, "Available Compressed Air Energy Storage (CAES) Plant Concepts". . . PUB Where and When.

Srithar Rajoo, Alessandro Romagnoli, Ricardo F. Martinez-Botas, "Unsteady performance analysis of a twin-entry variable geometry turbocharger turbine," in Journal of Energy 38 (2012) 176-189, www.elsevier.com/locate/energy, Jan. 21, 2012.

Mustafa Jahangoshai Rezaee, Alireza Moini, Ahmad Makui, "Operational and non-operational performance evaluation of thermal power plants in Iran: A game theory approach," in Journal of Energy 38 (2012) 96-103, www.elsevier.com/locate/energy, Jan. 21, 2012.

Janusz Kotowicz, Lukasz Bartela, "Optimisation of the connection of membrane CCS installation with a supercritical coal-fired power plant," in Journal of Energy 38 (2012) 118-127, www.elsevier.com/locate/energy, Jan. 28, 2012.

Sayyed Mohammad Sanaei, Toshihiko Nakata, "Optimum design of district heating: Application of a novel methodology for improved design of community scale integrated energy systems," in Journal of Energy 38 (2012) 190-204, www.elsevier.com/locate/energy, Jan. 27, 2012.

L.A. Sphaier, C.E.L. Nóbrega, "Parametric analysis of components effectiveness on desiccant cooling system performance," in Journal of Energy 38 (2012) 157-166, www.elsevier.com/locate/energy, Jan. 20, 2012.

Qiming Li, Yingbo Chen, Dong Joo Lee, Fang Li, Hern Kim, "Preparation of Y-zeolite/CoCl2 doped PVDF composite nanofiber and its application in hydrogen production," in Journal of Energy 38 (2012) 144-150, www.elsevier.com/locate/energy, Jan. 20, 2012.

Ahmed Al-Ghandoor, Murad Samhouri, Ismael Al-Hinti, Jamal Jaber, Mohammad Al-Rawashdeh, "Projection of future transport energy demand of Jordan using adaptive neuro-fuzzy technique," in Journal of Energy 38 (2012) 128-135, www.elsevier.com/locate/energy, Jan. 9, 2012.

Junnian Zheng, Jerald A. Caton, "Second law analysis of a low temperature combustion diesel engine: Effect of injection timing and exhaust gas recirculation," in Journal of Energy 38 (2012) 78-84, www.elsevier.com/locate/energy, Jan. 24, 2012.

Chao He, Chao Liu, Hong Gao, Hui Xie, Yourong Li, Shuangying Wu and Jinliang Xu, "The optimal evaporation temperature and working fluids for subcritical organic Rankine cycle," Energy, vol. 38 (2012) p. 136-143.

Editorial board listing, Energy (2012).

\* cited by examiner

SYSTEM, METHOD AND APPARATUS FOR IMPROVING GAS TURBINE PERFORMANCE WITH COMPRESSED AIR ENERGY STORAGE

CROSS REFERENCE TO RELATED APPLICATIONS

This application claims priority from U.S. Provisional Patent Application No. 62/302,672 filed on Mar. 2, 2016 and entitled "Stored Compressed Air as a Cooled Air Injection System and method for Gas Turbines," which is incorporated herein by reference in its entirety for all purposes.

FIELD OF THE DISCLOSURE

The present disclosure relates generally to gas turbine systems, and more particularly, to methods and systems for improving efficiency of gas turbines.

BACKGROUND

Gas turbines are commonly used to produce electrical power. The efficiency demands on all forms of electrical power are constantly raising. One approach to improving gas turbine efficiency includes adding a steam injection system. It is in this context that the following embodiments arise.

SUMMARY

Broadly speaking, the present disclosure fills these needs by providing a system, method and apparatus for using air supplied by a compressed air energy storage system to improve the efficiency of gas turbines. It should be appreciated that the present disclosure can be implemented in numerous ways, including as a process, an apparatus, a system, computer readable media, or a device. Several inventive embodiments of the present disclosure are described below.

In one implementation, a compressed air energy storage system provides cooled, higher than atmospheric pressure air charge to provide the entire intake air charge for a substantially standard gas turbine. This cool, high pressure intake air charge has a supercharging like effect on the operation of the gas turbine and improve efficiencies and output power of the gas turbine.

In another implementation, a compressed air energy storage system provides cooled, high pressure air charge that can be injected in one or more stages in the compressor of a gas turbine. This cool, high pressure air charge injection can increase the mass flow through each of the compressor stages to improve efficiencies and output power of the gas turbine.

In still another implementation, a compressed air energy storage system provides cooled, high pressure air charge that can be heated using heat exchangers that capture waste heat from the gas turbine to heat the high pressure air charge. The heated, high pressure air charge can then be injected into the combustion chamber to improve thermal efficiency and improve the power output of the gas turbine.

Other implementations include combinations of two or more of the foregoing implementations to provide further improvements on the efficiencies and power output of the gas turbine.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The present disclosure will be readily understood by the following detailed description in conjunction with the accompanying drawings.

DETAILED DESCRIPTION

Several exemplary embodiments for a system, method and apparatus for using air supplied by a compressed air energy storage system to improve the efficiency of gas turbines will now be described. It will be apparent to those skilled in the art that the present disclosure may be practiced without some or all of the specific details set forth herein.

Figure 1:
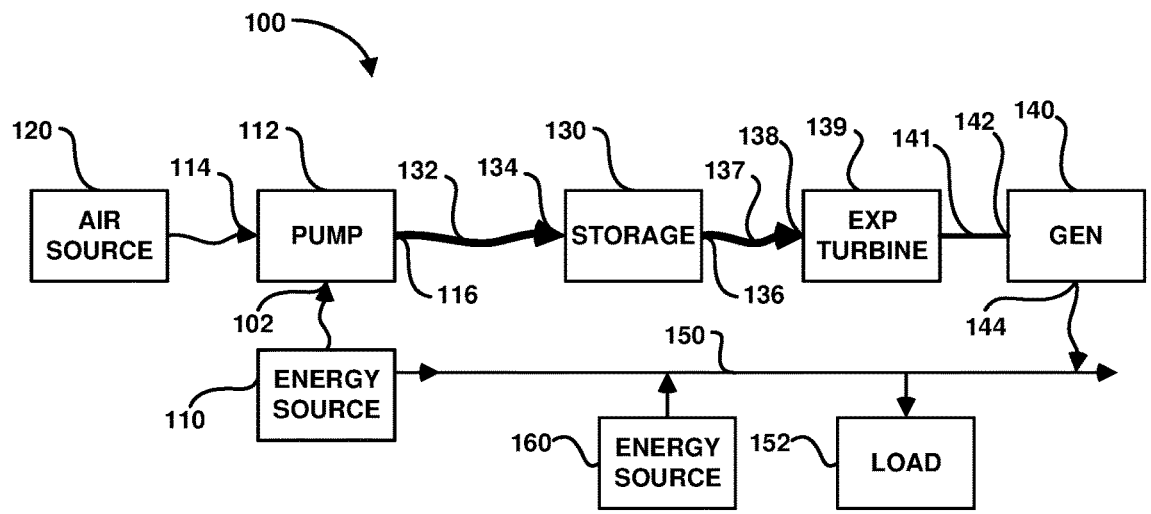
FIG. 1 is a simplified schematic diagram of a compressed air energy storage system, for implementing embodiments of the present disclosure.

Compressed air energy storage (CAES) systems are used to store excess, off-peak, low demand, intermittent or otherwise inexpensive energy from available energy source(s). Compressed air energy storage systems use the available energy sources to compress air in a storage volume. FIG. 1 is a simplified schematic diagram of a compressed air energy storage system 100, for implementing embodiments of the present disclosure. The compressed air energy storage system 100 includes a power input 102 for receiving power from an available energy source 110. The compressed air energy storage system 100 also includes a compressor 112 or pumping stage has a pumping stage inlet 114 coupled to an air source (e.g., atmosphere or other gaseous, compressible medium) 120 and a pumping stage outlet 116 coupled to a compressed charge inlet line 132 coupled to a storage inlet 134 of a storage volume 130.

The storage volume 130 includes a storage outlet 136 coupled to a compressed charge outlet line 138. The compressed charge outlet line 138 is coupled to a pressurized charge inlet port 138 of an expansion turbine 139. The expansion turbine 139 converts the pressurized air to mechanical energy. The expansion turbine 139 drives a driveshaft 141. The driveshaft 141 drives an energy conversion system 140. The energy conversion system 140 is capable of generating electrical energy. The energy conversion system 140 includes an electrical power outlet 144 coupled to a power grid 150. The power grid 150 distributes the electrical power to the consumers (e.g., load) 152 of the electrical power grid. The power grid 150 may also be connected to other electrical power generating sources 160 and the energy source 110.

Figure 2A:
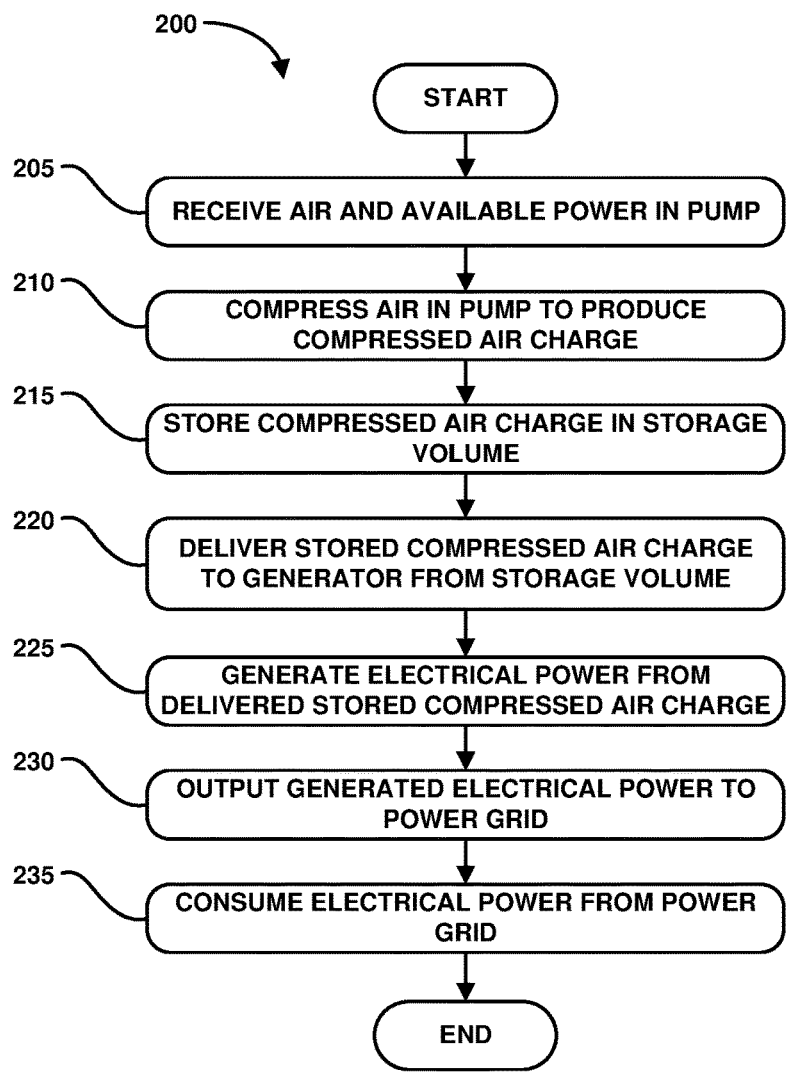
FIG. 2A is a flowchart diagram that illustrates the method operations performed in operating the compressed air energy storage system, for implementing embodiments of the present disclosure.

FIG. 2A is a flowchart diagram that illustrates the method operations 200 performed in operating the compressed air energy storage system 100, for implementing embodiments of the present disclosure. The operations illustrated herein are by way of example, as it should be understood that some operations may have sub-operations and in other instances, certain operations described herein may not be included in the illustrated operations. With this in mind, the method and operations 200 will now be described.

In an operation 205, the pump 112 receives available power from the energy source 110 and air, or other compressible gaseous media, from an air source 120. Example energy sources can include excess or inexpensive energy available from the power grid 150 that is not being used by the load 152. Inexpensive energy available from the power grid 150 can include off peak energy produced during hours of the day when energy usage is less than peak energy demand times. Examples can include nights, weekends and cooler periods during hot portions of the year and warmer periods during cooler portions of the year. Other energy sources can include intermittent energy sources such as wind and solar that are only available when wind and sunlight are available, respectively.

In an operation 210, the pump compresses the air to produce a compressed air charge. The compressed air charge is then stored in the storage volume 130 in an operation 215. The compressed air charge can be stored in the compressed air storage volume 130 for an indefinite period of time. In at least one implementation, the compressed air charge is also cooled in the storage volume 130. The compressor charge can be cooled in the compressed air storage volume 130 due to external factors of the storage volume. In one implementation, the storage volume 130 is an underground cavern that has a relatively lower temperature and absorbs heat contained in the compressed air charge. In another implementation, the storage volume 130 is underwater such as near the bottom of the ocean, where the temperature of the ocean is substantially cooler than the compressed air charge and the heat from the compressed air charge is absorbed into the water surrounding the storage volume. FIG. 2A shows an underwater storage volume 130, for implementing embodiments of the present disclosure.

In an operation 220, the stored compressed air charge is delivered from the storage volume 130 to the expansion turbine 139 which drives the generator 140. The expansion turbine 139 and the generator 140 convert the pressure of the stored compressed air charge into electrical power, in an operation 225. Additional details of how the generator 140 converts the pressure of the stored compressed air charge into electrical power will be described in more detail below.

In an operation 230, the generated electrical power output from the generator 140 is delivered to the power grid. One or more loads 152 consume the electrical power from the power grid 150 in an operation 235, and the method operations can end.

Figure 2B:
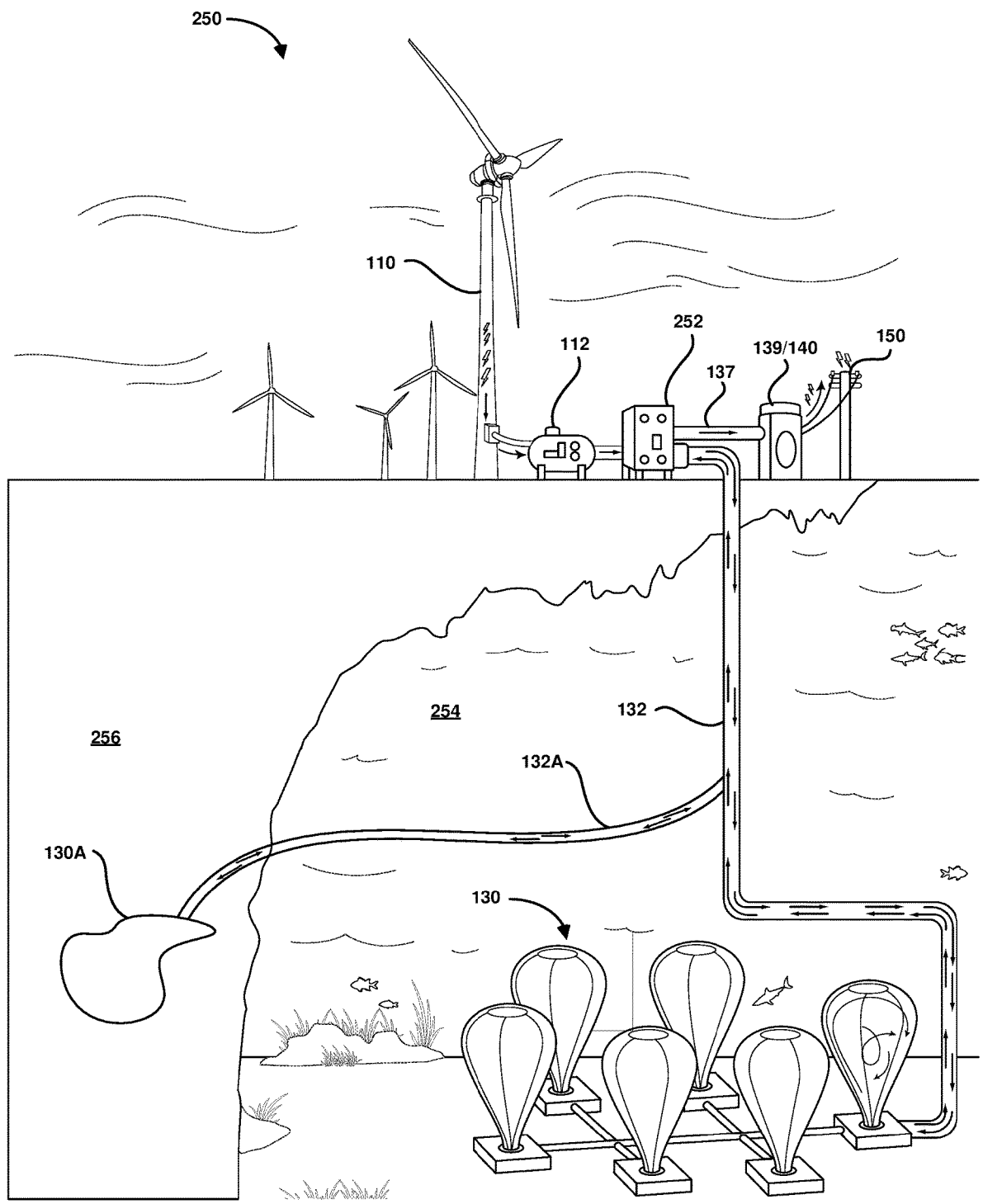
FIG. 2B is a pictorial diagram of a CAES, for implementing embodiments of the present disclosure.

FIG. 2B is a pictorial diagram of a diabatic CAES 250, for implementing embodiments of the present disclosure. In a compressed air energy storage system, air, or other compressible medium, is compressed from typical ambient condition (e.g., about 1 bar, and about 15 degrees C.) to a pressure of about 70 bar and a temperature of about 150 degrees C. The air can be compressed using multiple stage electric compressors with water intercooling. The compressed air temperature can be further reduced, at constant pressure, to about 50° C. using additional cooling stages. The cooled compressed air charge is injected into storage volumes such as salt caverns, where the compressed air charge ultimately reaches thermal equilibrium with the surrounding strata at about 15-20 degrees C. This method of storing the compressed air energy is known as diabatic CAES. The diabatic CAES 250 includes an intermittent power source 110 such as a windmill or solar power source. At least a portion of the power produced by the intermittent power source 110 is used to power a compressor 112 that compresses air or other compressible media. A heat exchanger 252 removes a portion of the heat generated during compression of the compressible media. The cooled, compressed media is then stored in a storage volume 130 via the compressed charge inlet line 132 coupled to the storage inlet 134 of the storage volume. The storage volume 130 can be located underwater 254 or underground 256, such as a storage cave 130A coupled to the compressed charge inlet line 132 by a compressed supply line 132A. During power generation, the compressed charge flows from the storage volume 130 back to the heat exchanger 252 to be warmed by the heat extracted from the compressed media. The warmed, compressed charge is then directed to an expansion turbine and generator 139/140 to produce electrical power for the grid 150.

Diabatic CAES highlights one of the fundamental challenges of the technology: the thermal heat of compression is entirely lost to the environment (e.g., the surrounding strata of the storage volume) and must somehow be returned to the gas, usually through a combustion process, prior to being expanded through a turbine. Since the expansion turbine is completely decoupled from the compressor, the expansion turbine can generate nearly three times the power of a corresponding simple cycle gas turbine operating at the same conditions as described in more detail below in a pressure ratio and temperature diagram of FIG. 3. Thus, if the compressed air can be procured at a time when the electric rates are low, compared to when the turbine is running, the system may be profitable, despite the heat losses.

Figure 3:
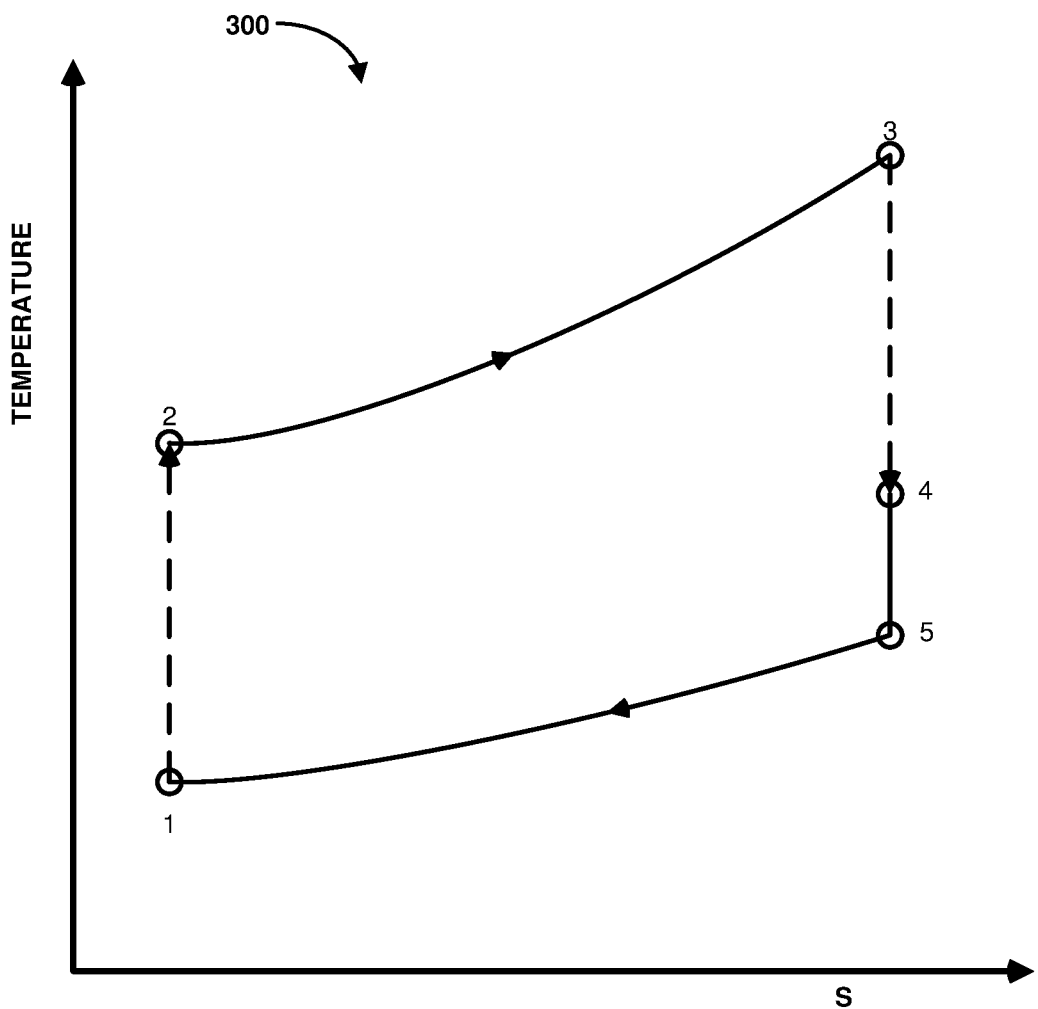
FIG. 3 is a simplified graphical representation of a TS relationship of the simple gas turbine cycle.

FIG. 3 is a simplified graphical representation of a TS relationship 300 of the simple gas turbine cycle. The diverging nature of the isobars (curves 2-3 and 1-5) means that the energy required to compress the air (line 1-2) is provided using only part of the expansion through the turbine, between the same two isobars: line 3-4 powers the gas generator compressor, and line 4-5 is available to power a power turbine and a generator. In a CAES system, heating the compressed gas to state point 3 means that the entire expansion along line 3-5 is available for power generation, or about three times more than in the gas turbine cycle.

Adiabatic CAES is a significant theoretical improvement on the CAES concept. Adiabatic CAES eliminates the need for a fuel system to reheat the stored compressed air prior to expansion in the turbine. Adiabatic CAES attempts to store the heat of compression in a high heat capacity material and then return the heat of compression to the compressed air prior to expansion. Significantly higher cycle efficiencies are possible using adiabatic CAES. However, the technical engineering challenges are such that no such adiabatic CAES system exists today.

Diabatic CAES is thus the only system that can be considered market-ready at the moment. However, even diabatic CAES requires specialty hardware, such as a specially designed power turbine capable of operating at pressure ratios many times larger than typical gas turbine systems. The specially designed power turbine would be unique to and developed specifically for diabatic CAES at a corresponding high cost. This high cost has slowed the market penetration of CAES. Another challenge is the very fundamental thermodynamic problem that characterizes diabatic CAES. Specifically, high-pressure stored air in the diabatic CAES system has a relatively low temperature and therefore low thermal energy.

Gas turbine industrial power plants have been around much longer than CAES-dedicated expansion turbines and represent a comparatively mature and competitively-priced technology that is widely used for power production today. With nearly a century of development, gas turbine industrial power plants have enjoyed many significant engineering improvements to boost cycle efficiency including: regenerative heating, steam injection (STIG), combined cycle generation. The improvements have made the gas turbine power generation cycle overall thermal efficiency routinely exceed the 50% mark. Thus, a power generation system that can directly leverage this engineering legacy, instead of requiring new engineering development ventures, immediately benefits from a significant cost advantage and is inherently less risky.

FIG. 3 shows that the work required by a gas turbine compressor is dependent on the temperature points separating the inlet and outlet pressure of the gas turbine compressor. This thermodynamic effect has motivated an entire industry to develop and promote pre-coolers and intercoolers in industrial gas turbines operations. The pre-coolers and intercoolers provide significant improvements to the cycle efficiency including: the simple gas turbine cycle suffers from high temperature (proportional to high thermal energy) through the compressor stages, which is made up by the turbine, before any useful work can be done through a power turbine.

CAES system developments focus on the long-term goal of adiabatic or isothermal implementations of the concept with the clear benefit of completely eliminating the use of any fuel. The adiabatic or isothermal implementations have proven to be so challenging from a technical and financial standpoint to the point of crippling new commercial CAES ventures and depriving utilities of the many CAES advantages realizable today, and ultimately delaying progress in CAES system developments. The approach described herein are more pragmatic, leveraging more mature technologies readily available today. One goal is to simply eliminate, inasmuch as possible, a dedicated CAES expansion turbine. With pressure ratios nearing 100 these CAES systems fall outside the range of most utility-scale gas turbine generator and thus require expensive, long-term development programs, with all the associated development risks, in addition to all the other risks associated with CAES systems.

Over the past several years, the large-scale adoption of wind and solar power by many utility companies has spurred renewed interest in CAES technology development as means for storing the power generated by wind and solar sources. Wind and solar power production cannot be easily tailored to power demands due to the intermittent and sporadic nature of wind and the intermittent nature of solar power. This intermittent nature of wind and solar power production has renewed interest in all means of power storage.

Two new "second generation" CAES technologies have been proposed. The second generation CAES technologies include CAES-AI (Air Injection) systems and CAES-IC (Inlet Chilling) systems. These second generation CAES systems combine the CAES power production step with an existing simple cycle gas turbine while using the significant exhaust heat energy of the gas turbine as a primary heat source for power production through the CAES expansion turbine. This uses the CAES as a bottoming cycle, similar to the Brayton-Rankine combined cycles used in many power generation plants.

Figure 4A:
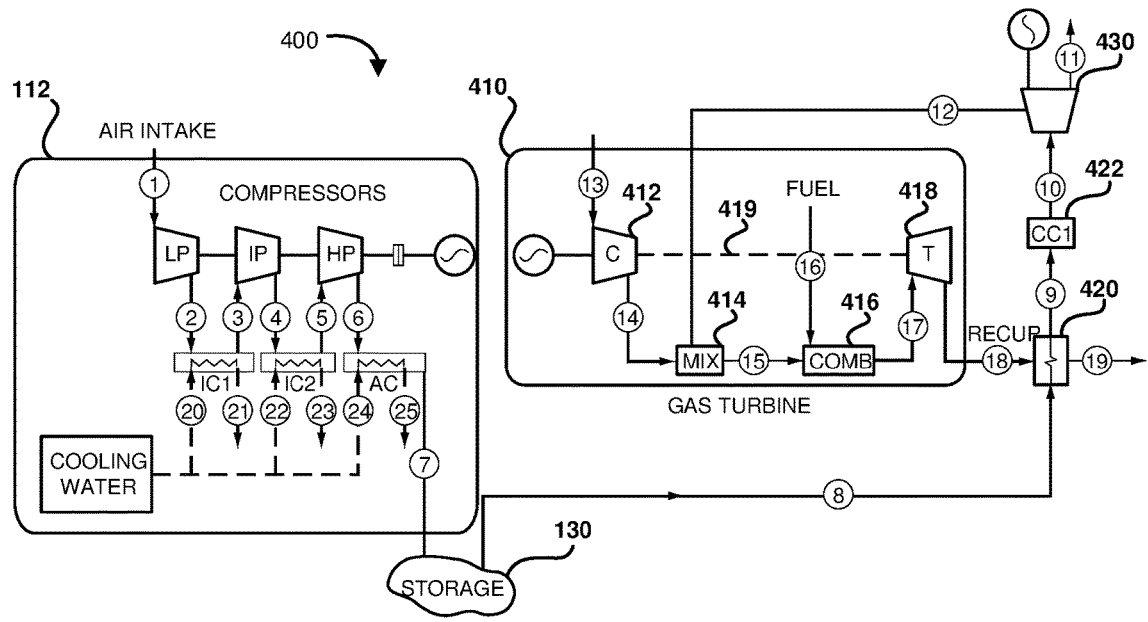
FIG. 4A is a simplified schematic diagram of a CAES-AI (Air Injection) system, for implementing embodiments of the present disclosure.

FIG. 4A is a simplified schematic diagram of a CAES-AI (Air Injection) system 400, for implementing embodiments of the present disclosure. The CAES-AI system 400 reinjects the CAES expanded air into the combustor of a simple cycle gas turbine. The CAES-AI system 400 includes a gas turbine 410. The gas turbine 410 includes a compressor 412 for compressing the inlet air. The compressor 412 produces a compressed inlet air charge that is injected into a mixing chamber 414. The mixing chamber produces a mixed inlet air charge by mixing the compressed inlet air charge with a reheated, expanded air charge from the storage volume 130 from the storage volume 130.

The mixed inlet air charge is then injected into a combustion chamber 416 with a corresponding quantity of fuel and combustion occurs producing a heated, high pressure, exhaust charge. The heated, high pressure, exhaust charge is injected into a turbine 418 of the gas turbine 410.

The turbine 418 expands the heated, high pressure, exhaust charge to produce mechanical energy that is coupled to the compressor 412 via a shaft 419. The turbine 418 outputs an exhaust charge with a significant quantity of heat to a recuperator heat exchanger 420. The recuperator heat exchanger 420 exchanges heat from the exhaust charge to the compressed air charge from the storage volume 130, to produce a reheated compressed air charge.

The reheated compressed air charge is then injected into a secondary combustion chamber 422. The reheated compressed air charge is injected into the secondary combustion chamber 422 at the high pressure of the storage volume 130. A quantity of fuel is also added to the secondary combustion chamber 422 to further heat the reheated compressed air charge and produce a further heated compressed air charge.

The further heated compressed air charge is then expanded in a CAES expansion turbine 430 to produce the reheated, expanded air charge at or above the pressure of the compressed inlet air charge in the mixing chamber 414. As described above, the reheated, expanded air charge is then injected into the mixing chamber 414.

The exhaust charge of the gas turbine 410 is used to provide the energy necessary to solve the CAES low thermal energy problem, via the recuperator heat exchanger 420. The CAES-AI approach limits the level of expansion available in the CAES expansion turbine 430, as the CAES expansion turbine outlet pressure must be at least as high as the primary gas turbine compressor outlet pressure, typically around 25-30 bars, though the reheated, expanded air charge provides a mass boost to the gas turbine cycle, without the penalty of compression.

Figure 4B:
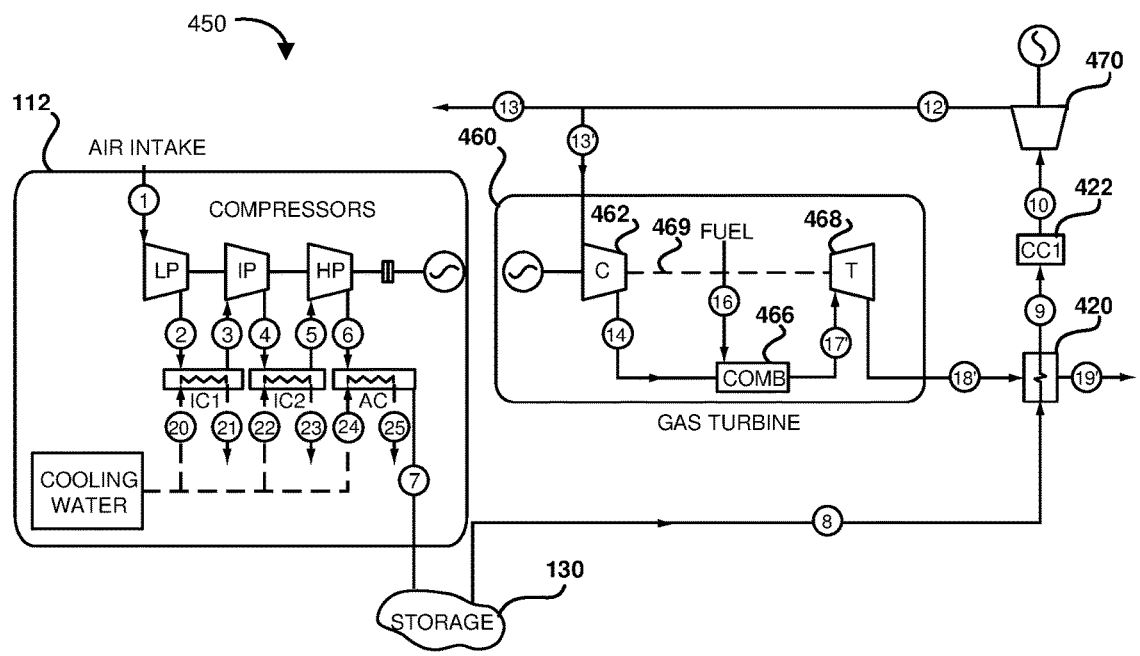
FIG. 4B is a simplified schematic diagram of a CAES-IC (Inlet Chilling) system, for implementing embodiments of the present disclosure.

FIG. 4B is a simplified schematic diagram of a CAES-IC (Inlet Chilling) system 450, for implementing embodiments of the present disclosure. The CAES-IC system 450 includes a gas turbine 460. The gas turbine 460 includes a compressor 462 for compressing the inlet air. The compressor 462 produces a compressed inlet air charge that is injected into a combustion chamber 466 with a corresponding quantity of fuel and combustion occurs producing a heated, high pressure, exhaust charge. The heated, high pressure, exhaust charge is injected into a turbine 468 of the gas turbine 460.

The turbine 468 expands the heated, high pressure, exhaust charge to produce mechanical energy that is coupled to the compressor 462 via a shaft 469. The turbine 468 outputs an exhaust charge with a significant quantity of heat to a recuperator heat exchanger 420. The recuperator heat exchanger 420 exchanges heat from the exhaust charge to the compressed air charge from the storage volume 130, to produce a reheated compressed air charge.

The reheated compressed air charge is then injected into a secondary combustion chamber 422. The reheated compressed air charge is injected into the secondary combustion chamber 422 at the high pressure of the storage volume 130. A quantity of fuel is also added to the secondary combustion chamber 422 to further heat the reheated compressed air charge and produce a further heated compressed air charge.

The further heated compressed air charge is then expanded in a CAES expansion turbine 470 to produce the reheated, expanded air charge at atmospheric pressure. The reheated, expanded air charge is injected into the inlet of the compressor 462. As described above, the reheated, expanded air charge is then injected into the mixing chamber 414.

The CAES-IC system 450 allows the full expansion of the CAES gas to atmospheric pressure and temperature level through the expansion turbine. The gas (air) is then injected directly into the primary turbine compressor inlet. The level of reheat through the recuperator is controllable and the temperature of the CAES air after expansion may be dropped below atmospheric inlet air to the gas turbine, to provide a chilling effect at compressor inlet.

The efficiency of the second generation CAES technology enhanced cycle is reportedly above 70%, similar to adiabatic CAES. The improvement provided by the second generation CAES systems only go part-way in mitigating the basic shortcomings of CAES systems, specifically low temperature of the compressed air charge from the storage volume 130 requiring reheat, and dedicated expansion turbines 430, 470.

Three, new, combined-cycle CAES systems and methods of energy production using diabatic CAES low temperature air supplied from the storage volume 130 are described herein. The combined-cycle CAES systems eliminate the need for a dedicated CAES expansion turbine and leverage the technology of existing gas turbine power plants. A fourth combined cycle CAES system combines both a gas turbine and a dedicated air turbine (as in previously discussed CAES systems) to further optimize the thermodynamic efficiency of the cycle beyond what each of the combined-cycle CAES systems can achieve individually. In each of the four combine-cycle CAES systems, one important goal is to minimize the re-engineering of the gas turbine, while maximizing the overall cycle efficiency.

Figure 5A:
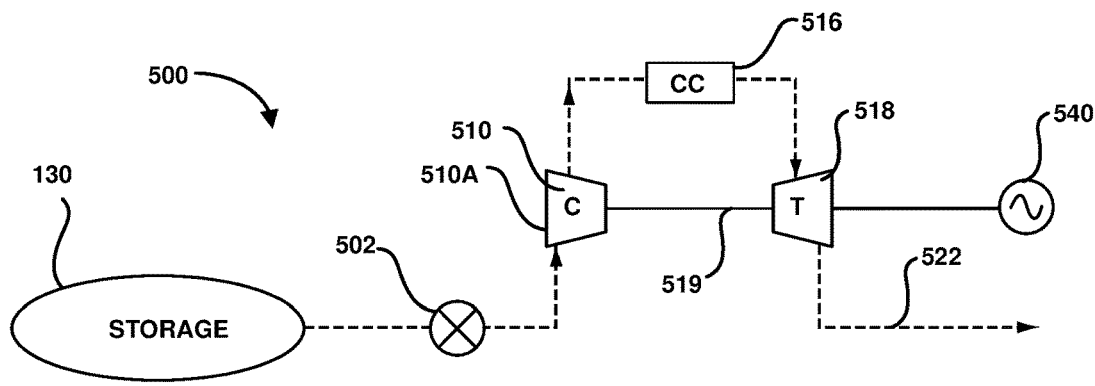
FIG. 5A is a simplified schematic diagram of a CAES-supercharger system, for implementing embodiments of the present disclosure.
Figure 5B:
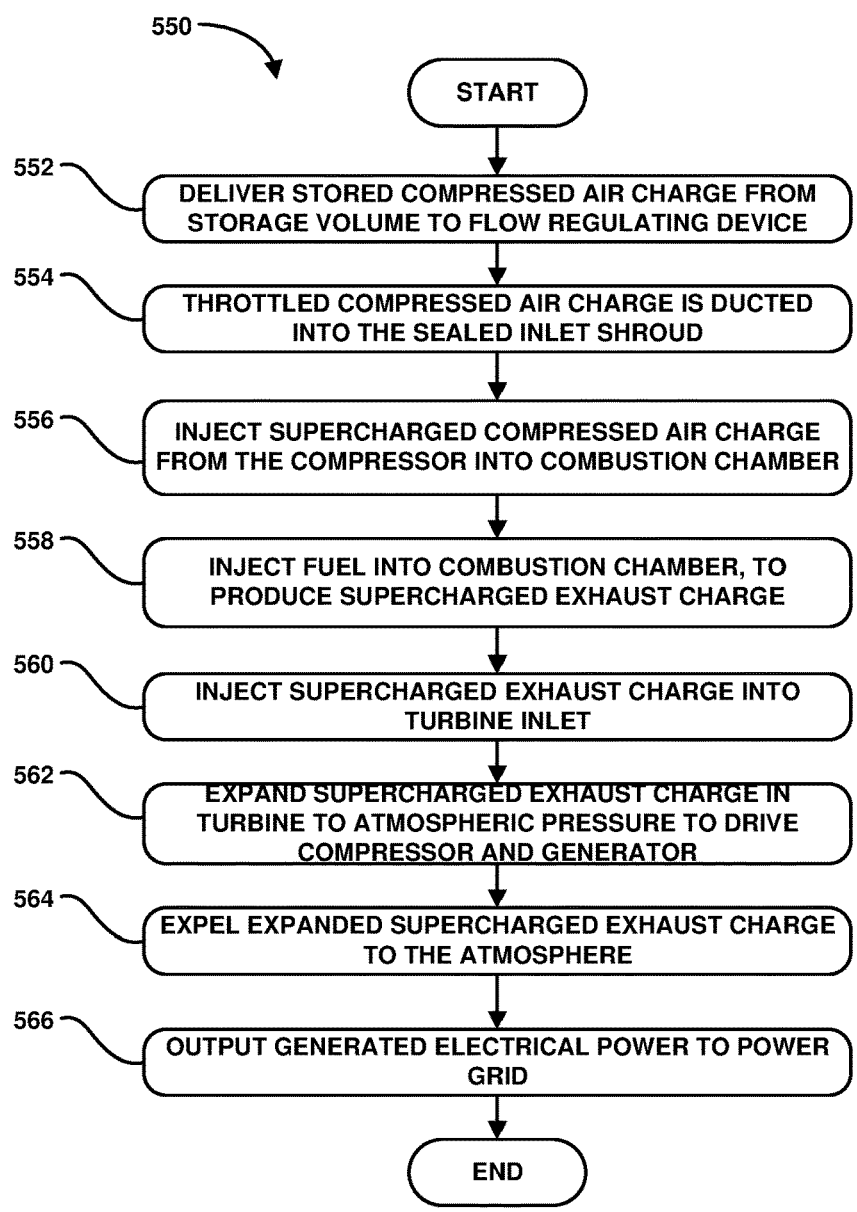
FIG. 5B is a flowchart diagram that illustrates the method operations performed in operating the CAES-supercharger system, for implementing embodiments of the present disclosure

FIG. 5A is a simplified schematic diagram of a CAES-supercharger system 500, for implementing embodiments of the present disclosure. FIG. 5B is a flowchart diagram that illustrates the method operations 550 performed in operating the CAES-supercharger system 500, for implementing embodiments of the present disclosure. The operations illustrated herein are by way of example, as it should be understood that some operations may have sub-operations and in other instances, certain operations described herein may not be included in the illustrated operations. With this in mind, the method and operations 500 will now be described.

The CAES-supercharger system 500 is a boosted gas turbine cycle, where the cold CAES stored air is throttled to a desired level, above atmospheric pressure (isenthalpic expansion; temperature remains essentially unchanged from the storage volume 130) and feeds the entire inlet of the gas turbine compressor through a sealed shroud 510A, providing uniform pre-cooling as well as supercharge, e.g., cold inlet air at higher than atmospheric pressure.

In an operation 552, a stored compressed air charge having a pressure of between about 3 bar and about 100 bar is delivered from the storage volume 130 to a flow regulation device 502 such as a throttle valve or a pressure regulator throttle. A throttled compressed air charge is output from the throttle valve or pressure regulator at a pressure of between about 1.3 bar and about 5 bar.

In an operation 554, the throttled compressed air charge is ducted into the sealed inlet shroud 510A of the compressor 510 and provides the entire intake air for the compressor to produce a supercharged compressed air charge having a pressure of between about 20 bar and about 40 bar.

The supercharged compressed air charge from the compressor 510 is injected into a combustion chamber 516 in an operation 556. A corresponding quantity of fuel is injected into the combustion chamber 516, to produce a supercharged exhaust charge, in an operation 558.

In an operation 560, the supercharged exhaust charge is injected to the inlet of a turbine 518. The supercharged exhaust charge is expanded by the turbine 518 to atmospheric pressure, in an operation 562. Expanding the supercharged exhaust charge causes the turbine 518 to rotate. The rotating turbine rotates the driveshaft 519 to drive the compressor 510 and generator 540. Rotating the compressor 510 compresses the intake air as described above. Rotating the generator 540 generates electrical power. The expanded supercharged exhaust charge is then expelled out an exhaust port 522 to the atmosphere, in an operation 564 and the electrical power is output to the power grid 150, and the method operations can end. A TS graph of the turbine cycle of the CAES-supercharger system 500 is discussed in more detail in FIG. 11 below.

In the CAES-supercharger system 500, no ambient air enters the gas turbine. The storage volume pre-cools in the intake charge, compared to ambient, atmospheric conditions. The performance of the gas turbine cycle is improved both by supercharging and by pre-cooling the inlet air charge. Boost level may be limited by a reversed thrust load specifications on the gas generator spool(s), and maximum allowable pressure at the combustor and turbine inlet, for a fixed pressure ratio. However, this is a relatively minor modification to a standard gas turbine design. The mass flow balance of the compressor/turbine gas generator is unaffected, but the pressure ratio across the compressor may now be kept significantly lower than that of the gas generator turbine/power turbine assembly, increasing the ratio of power available for power production. The performance of the gas turbine also becomes unaffected by variations in atmospheric temperature.

Figure 6A:
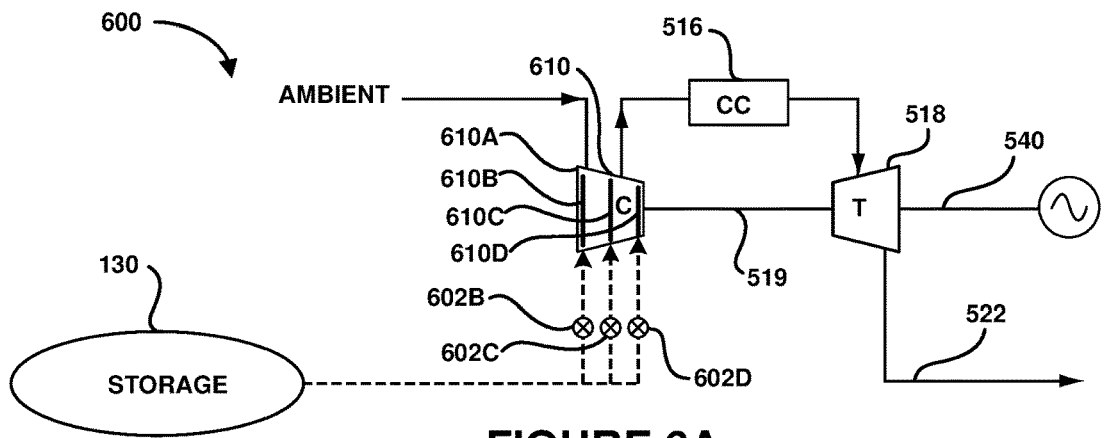
FIG. 6A is a simplified schematic diagram of a CAES-intercharger system, for implementing embodiments of the present disclosure.
Figure 6B:
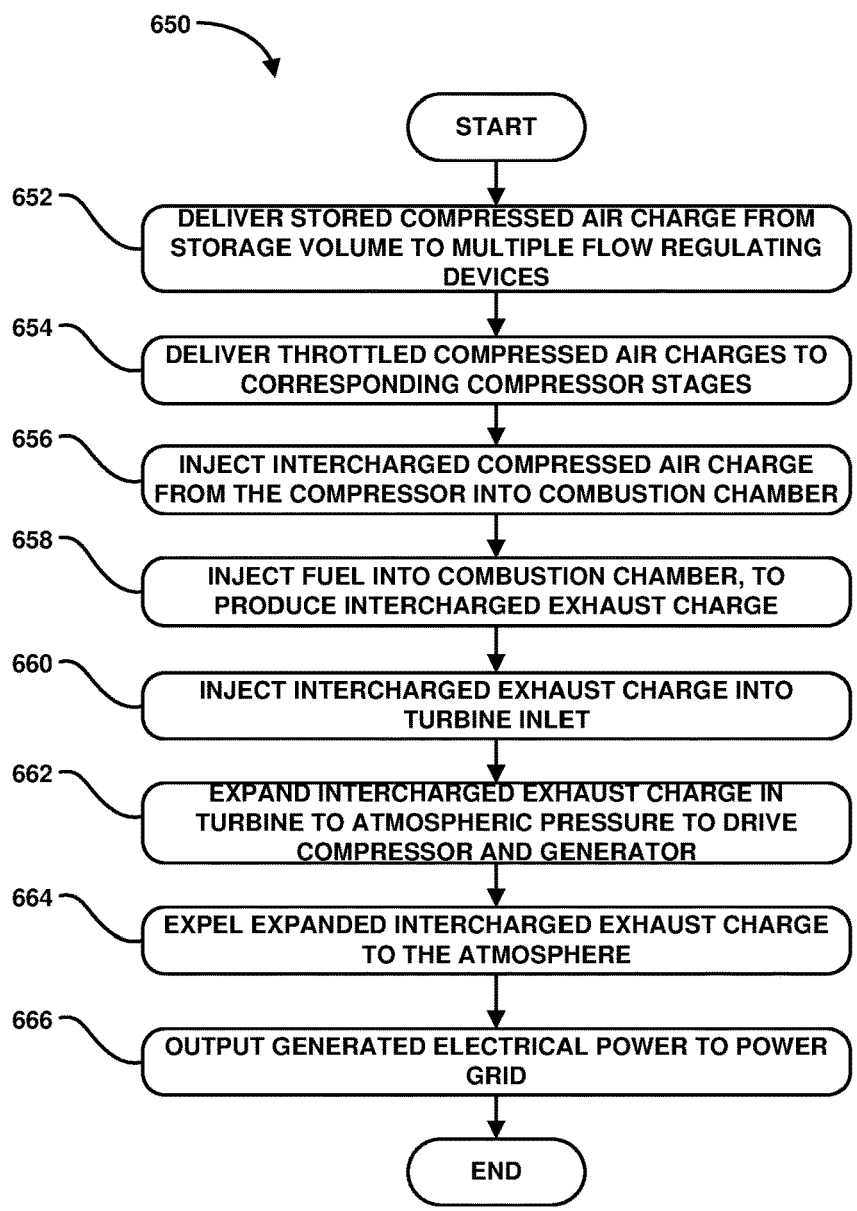
FIG. 6B is a flowchart diagram that illustrates the method operations 650 performed in operating the CAES-intercharger system, for implementing embodiments of the present disclosure

FIG. 6A is a simplified schematic diagram of a CAES-intercharger system 600, for implementing embodiments of the present disclosure. FIG. 6B is a flowchart diagram that illustrates the method operations 650 performed in operating the CAES-intercharger system 600, for implementing embodiments of the present disclosure. The operations illustrated herein are by way of example, as it should be understood that some operations may have sub-operations and in other instances, certain operations described herein may not be included in the illustrated operations. With this in mind, the method and operations 650 will now be described. The CAES-intercharger system 600 gas turbine cycle consists of an inter-stage compressor injection process, where the CAES air supply is throttled to a level suitable for pressure-matching each of more than one compressor stage, for injection into that stage.

The CAES-intercharger system 600 gas turbine cycle operates with ambient air at the inlet 610A of the compressor 610, but each compressor stage 610B, 610C, 601D receives a compressed air charge from the CAES storage 130 for intercooling and increased mass flow. Each compressor stage 610B, 610C, 601D thus benefits from intercooling by mixing with the incoming CAES stored compressed air charge, and the mass flow rate increases through each subsequent compressor stage. The mass flow rate through the last compressor stage matches the flow through the turbine 618, but the total work required by all compressor stages 610B, 610C, 610D is reduced. There is no thrust loading impact on the gas generator spools. It should be noted that while only three compressor stages 610B, 610C, 610D are described herein, it should be understood that the compressor 610 can include more than three compressor stages and the incoming CAES stored compressed air charge can be injected into any one or more of the compressor stages.

In an operation 652, a stored compressed air charge is delivered from the storage volume 130 to multiple flow regulation devices 602B, 602C and 602D such as a throttle valve or a pressure regulator throttle. Each of the multiple flow regulation devices 602B, 602C and 602D outputs a corresponding throttled compressed air charge 604B, 604C and 604D. The throttled compressed air charges have a pressure of corresponding to corresponding stages 610B, 610C, 610D of the compressor 610. While not shown, one of the throttled compressed air charges can be applied to a sealed inlet shroud as described above in FIGS. 5A and 5B.

In an operation 654, the throttled compressed air charge is injected into the corresponding stages 610B, 610C, 610D of the compressor 610. The compressor produces an intercharged compressed air charge having a pressure of between about 5 bar and about 30 bar.

The intercharged compressed air charge from the compressor 610 is injected into a combustion chamber 516 in an operation 656. A corresponding quantity of fuel is injected into the combustion chamber 516, to produce an intercharged exhaust charge, in an operation 658.

In an operation 660, the intercharged exhaust charge is injected to the inlet of a turbine 518. The intercharged exhaust charge is expanded by the turbine 518 to atmospheric pressure, in an operation 662. Expanding the intercharged exhaust charge causes the turbine 518 to rotate. The rotating turbine rotates the driveshaft 519 to drive the compressor 610 and generator 540. Rotating the compressor 610 compresses the intake air as described above. Rotating the generator 540 generates electrical power. The expanded intercharged exhaust charge is then expelled out an exhaust port 522 to the atmosphere, in an operation 664 and the electrical power is output to the power grid 150, and the method operations can end. A TS graph of the turbine cycle of the CAES-intercharger system 600 is discussed in more detail in FIG. 12 below.

Figure 7A:
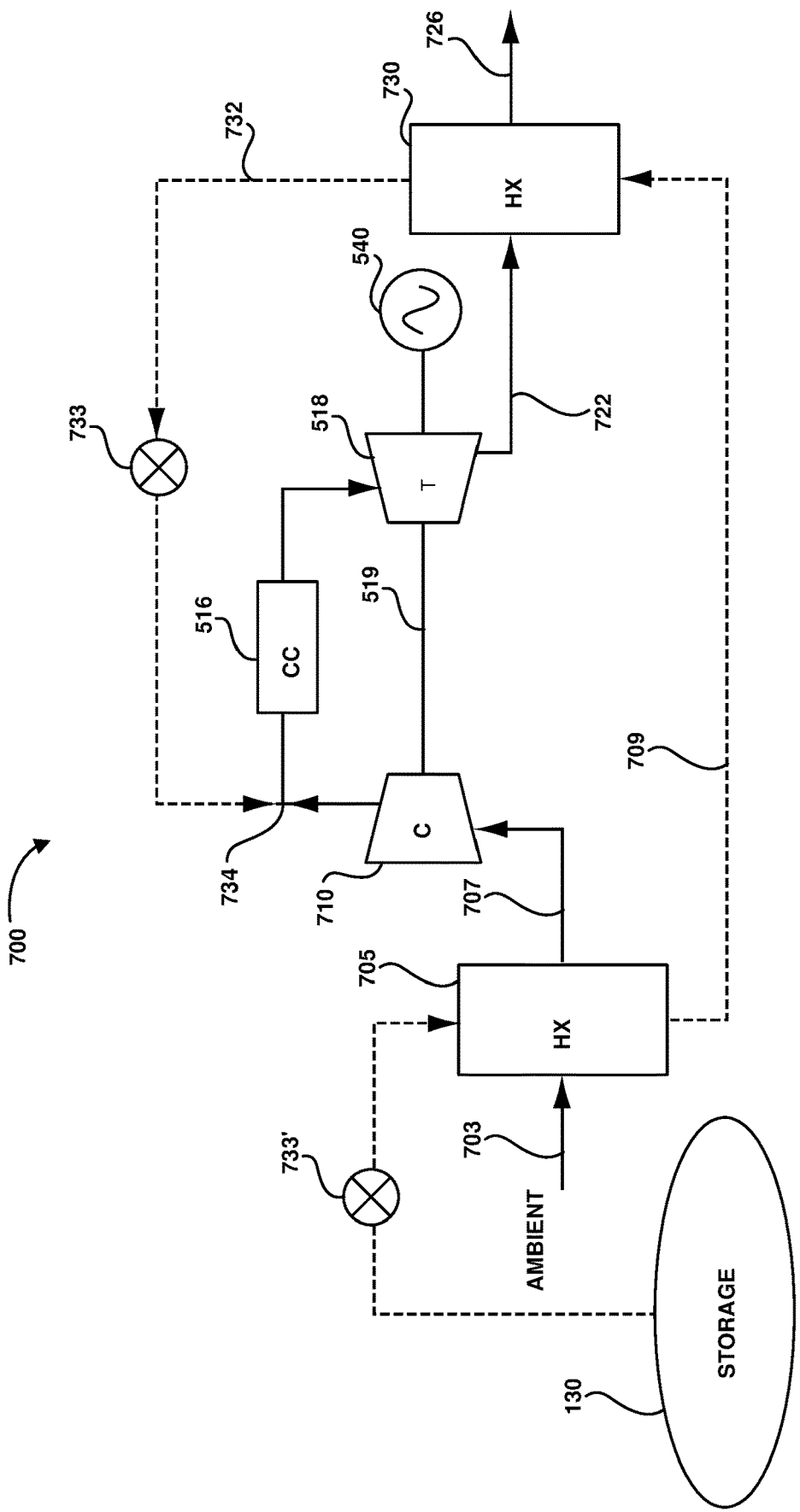
FIG. 7A is a simplified schematic diagram of a CAES-gas turbine augmented system, for implementing embodiments of the present disclosure.
Figure 7B:
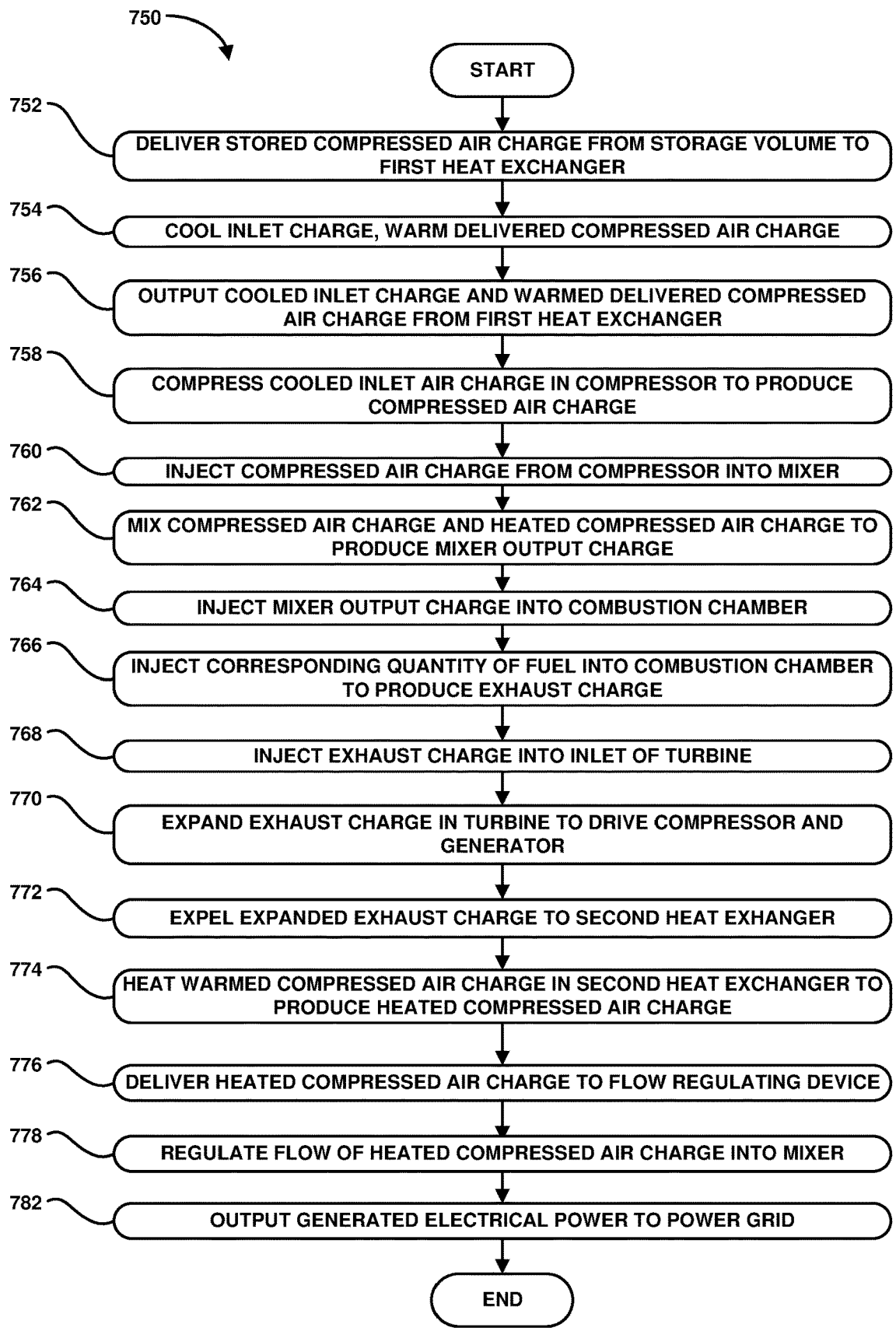
FIG. 7B is a flowchart diagram that illustrates the method operations performed in operating the CAES-gas turbine augmented system, for implementing embodiments of the present disclosure

FIG. 7A is a simplified schematic diagram of a CAES-gas turbine augmented system 700, for implementing embodiments of the present disclosure. FIG. 7B is a flowchart diagram that illustrates the method operations 750 performed in operating the CAES-gas turbine augmented system 700, for implementing embodiments of the present disclosure. The operations illustrated herein are by way of example, as it should be understood that some operations may have sub-operations and in other instances, certain operations described herein may not be included in the illustrated operations. With this in mind, the method and operations 750 will now be described. The CAES-gas turbine augmented system 700 gas turbine cycle maximizes the benefits of CAES on the simple cycle gas turbine, with three distinct features:

Pre-cools the gas turbine inlets, taking advantage of the CAES low temperature storage volume 130.

Uses the turbine 718 exhaust for regenerative heating to minimize fuel energy required in the combustion chamber.

Injects the heated air directly into the gas turbine combustion chamber to leverage CAES pressure and bypass the compressor 710.

CAES-gas turbine augmented system 700 flow path is shown with dash lines; ambient air flow path is shown with solid lines. Note two heat exchangers 705, 730, for precooling and for regenerative heating. From an overall exergy perspective, the CAES-gas turbine augmented system 700 cycle is optimized when the CAES storage volume 130 pressure is near that of the compressor output pressure, but the cycle efficiency of the gas turbine is maximized in all cases.

In an operation 752, a stored compressed air charge is delivered from the storage volume 130 to a first heat exchanger 705. In an operation 754, the delivered compressed air charge cools an inlet air charge 703 for the compressor 710, in the first heat exchanger 705. Conversely, the inlet air charge 703 heats the delivered compressed air charge, in the first heat exchanger 705. In one implementation the flow rate ratio of the inlet air charge 703 and the delivered compressed air charge is 10 to 1 such that the mass of the inlet air charge is 10 times the mass of the delivered compressed air charge.

In an operation 756, the first heat exchanger outputs a cooled inlet air charge 707 at a temperature of between about 8 to about 18 degrees C. to the inlet of the compressor 710 and outputs a warmed compressed air charge 709 at a temperature of between about 10 to about 18 degrees C. to a second heat exchanger 730. The second heat exchanger 730 has a pressure drop of less than between about 0 percent and about 5 percent, absolute, when the inlet pressure is compared to the outlet pressure of the second heat exchanger. The CAES storage volume 130 has a temperature of about 5 degrees C. and the ambient temperature is about at 20 degrees C. The mass flow rate bled from the storage volume is less than the total gas turbine flow rate. In one implementation, the mass flow rate bled from the storage volume 130 is between about 5 percent and about 10 percent of gas turbine mass flow rate. In another implantation, the stream temperatures on both sides are bound by the temperature of the CAES storage volume 130 and the ambient temperature.

In an operation 758, the cooled inlet air charge 707 is compressed through the compressor 710 to produce a compressed air charge. The compressed air charge from the compressor 710 is injected into a mixer 734, in an operation 760. One or more throttle valves 733, 733' are used to control the flow of the compressed air charge through the CAES-gas turbine augmented system 700. The one or more throttle valves 733, 733' can be located before the inlet of the first heat exchanger 705 or after the outlet of the second heat exchanger 730 or located in both locations in at least one implementation. The mixer mixes the compressed air charge from the compressor 610 with a heated compressed air charge to produce a mixer output charge, in an operation 762.

The mixer output charge is injected into the combustion chamber 516, in an operation 764. A corresponding quantity of fuel is injected into the combustion chamber 516, to produce an exhaust charge, in an operation 766.

In an operation 768, the exhaust charge is injected to the inlet of a turbine 518. The exhaust charge is expanded by the turbine 518 to atmospheric pressure, in an operation 770. Expanding the exhaust charge causes the turbine 518 to rotate. The rotating turbine rotates the driveshaft 519 to drive the compressor 710 and generator 540. Rotating the compressor 710 compresses the intake air as described above. Rotating the generator 540 generates electrical power.

The expanded exhaust charge is then expelled out an exhaust port 722 to the second heat exchanger 730, in an operation 772. In an operation 774, the second heat exchanger 730 transfers heat from the expanded exhaust charge to the warmed compressed air charge 709 to produce a heated compressed air charge 732. The heated compressed air charge 732 has a pressure equal to or greater than the output pressure of the compressor 710. The heated compressed air charge 732 has a temperature of less than the temperature of the expanded exhaust charge. It should be understood that the heated compressed air charge 732 may have a temperature of nearly equal to the temperature of the expanded exhaust charge. The temperature of the heated compressed air charge can be between about 150 degrees C. and about 400 degrees C. with a pressure drop of between about 0 percent and about 5 percent, absolute.

In an operation 776, the heated compressed air charge 732 is delivered to a flow regulating device 733 and the now cooled expanded exhaust charge is discharged to atmosphere and the electrical power is output to the power grid 150. The flow regulating device 733 controls the pressure and flow of the heated compressed air charge 732 into the mixer 734 and into the combustion chamber 516, as described above, in an operation 772, and the method operations can end. The mixture produced by the mixer 734 can have a temperature of between about 200 degrees C. and about 500 degrees C. A TS graph of the turbine cycle of the CAES-gas turbine augmented system 700 is discussed in more detail in FIG. 13 below.

Figure 8A:
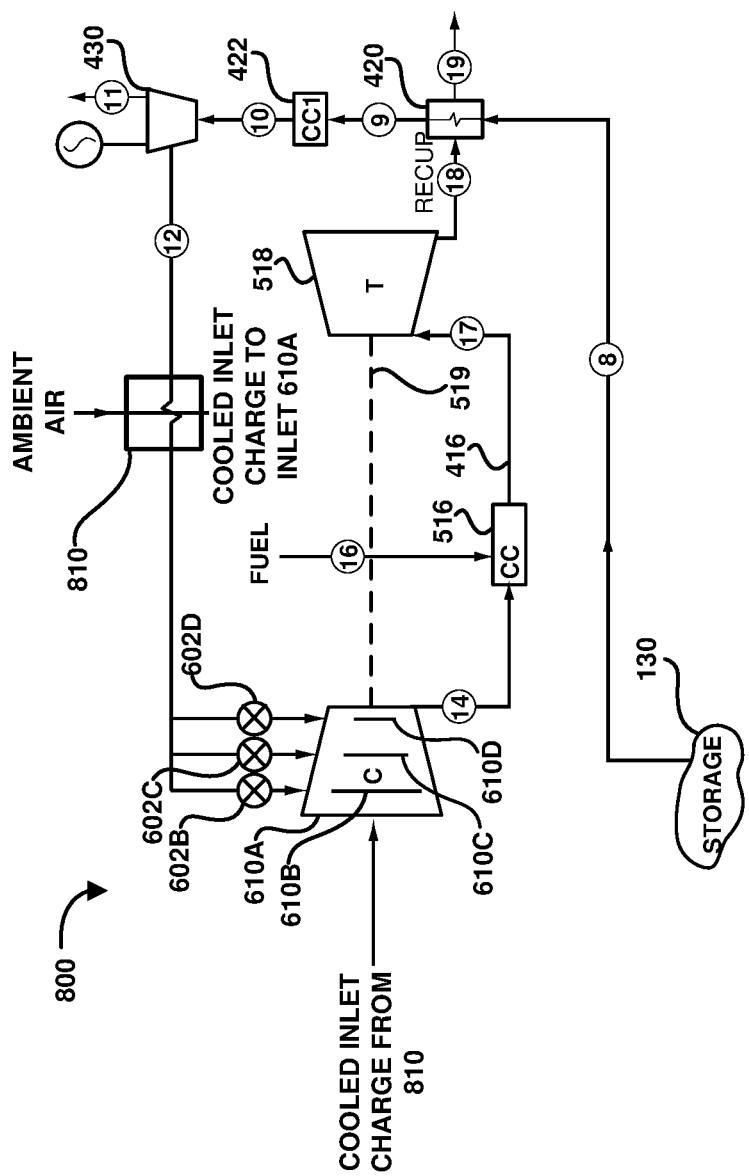
FIG. 8A is a CAES-intercharger-air injector (AI) system, for implementing embodiments of the present disclosure.
Figure 8B:
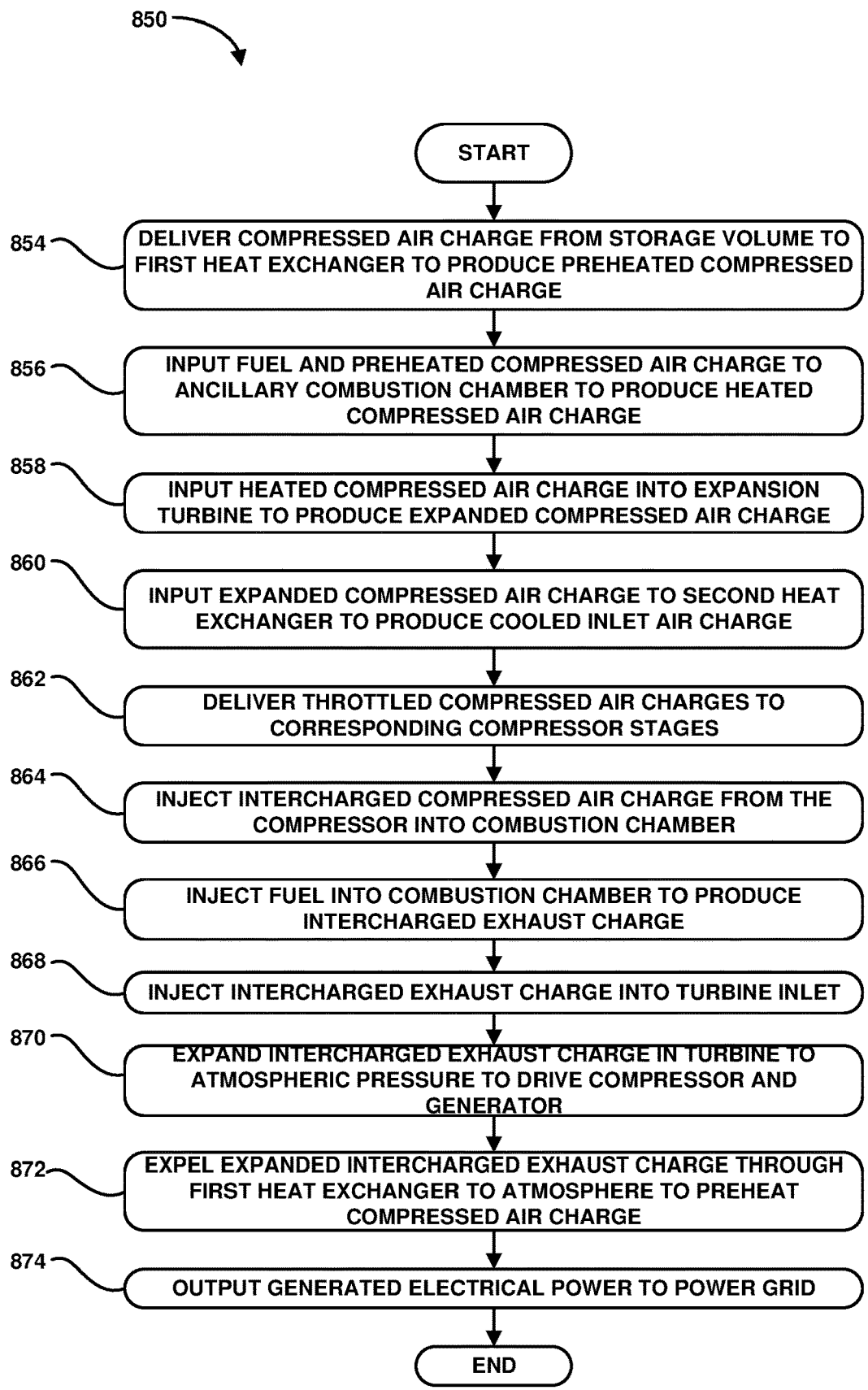
FIG. 8B is a flowchart diagram that illustrates the method operations 850 performed in operating the CAES-intercharger-AI system, for implementing embodiments of the present disclosure.

FIG. 8A is a CAES-intercharger-air injection (AI) system 800, for implementing embodiments of the present disclosure. FIG. 8B is a flowchart diagram that illustrates the method operations 850 performed in operating the CAES-intercharger-AI system 800, for implementing embodiments of the present disclosure. The CAES-intercharger-AI system 800 includes another turbine cycle improvement that builds on the diabatic CAES turbine cycles (i.e., with expansion turbines), where CAES storage volume 130 pressures exceed the compressor output pressures of a typical, simple cycle gas turbine. Such a turbine cycle requires both a gas turbine and a standard CAES expansion turbine and builds upon the advantages of CAES-AI system 400, described above, in FIG. 4A.

The CAES-intercharger-AI system 800 is a combination of elements of the CAES-AI system 400, described above, in FIG. 4A, and the CAES-intercharger system 600, described above in FIG. 6A, with the addition of a second heat exchanger 810. The output of the CAES expansion turbine 430 in the bottom cycle (state point 12 in FIG. 4A), is maintained at a pressure higher than the gas turbine compressor outlet (state point 14), though cooled below the CAES storage volume 130 temperature by the expansion in the expansion turbine 430, within the limits of water and ice entrainment. The expansion turbine 430, operates at the CAES storage volume 130 pressure. The cooled CAES air charge pre-cools the gas turbine inlet air and proceeds as described in the CAES-intercharger system 600, with controlled throttle and injection at corresponding stages 610B, 610C, 610D of the compressor 610A. This combined cycle provides the advantages of the CAES-intercharger system 600, with improved pre-cooling. The pre-cooling is limited by water and ice entrainment at operations below the CAES storage volume 130 dew-point temperature. This implementation allows for CAES storage volume 130 pressures that are significantly higher than at least some of the other turbine cycles described herein, without incurring an exergy penalty, since the dedicated CAES expansion turbine 430 used the full CAES reservoir pressure, instead of throttling to the injection pressures, and reduces the thermal penalty at the combustor, in contrast to the CAES-AI system 400, and precools the compressor stages, improving its performance.

Referring again to FIG. 8B, in an operation 854, a compressed air charge from the storage volume 130 is delivered to a first heat exchanger 420 to produce preheated compressed air charge. The exhaust gases output from the turbine 518 are used to preheat the compressed air charge in the heat exchanger 420.

The preheated the compressed air charge and a corresponding quantity of fuel are input to an ancillary combustion chamber 422 to produce a heated compressed air charge, in an operation 856.

In an operation 858, the heated compressed air charge is input to expansion turbine 430 to produce an expanded compressed air charge. The expanded compressed air charge is input to a second heat exchanger 810 to produce a cooled inlet air charge that is then delivered to the inlet 610A of the compressor 610, in an operation 860. The expanded compressed air charge is significantly cooled by expansion turbine 430. By way of example, the expansion turbine 430 inlet temperature, at state 10, can be between about 500 and about 900 degrees C. The expansion turbine 430 outlet temperature at state 12 can be between about 3 and about 500 degrees C. The ambient air can be cooled by between about 5 and about 20 degrees C. in the heat exchanger 810. As a result, the gas turbine cycle is further improved as the ambient air temperature increases.

In an operation 862, the expanded compressed air charge is delivered to multiple throttle or pressure and flow regulating devices 602B, 602C, 602D that correspond to compressor stages 610B, 610C, 610D, respectively. The pressure and flow regulating devices 602B, 602C, 602D throttle the expanded compressed air charge to the corresponding pressure and flow rate needed for injection into the corresponding compressor stages 610B, 610C, 610D. The compressor 610 produces an intercharged compressed air charge having a pressure of between about 5 bar and about 30 bar.

The intercharged compressed air charge from the compressor 610 is injected into the combustion chamber 516 in an operation 864. A corresponding quantity of fuel is injected into the combustion chamber 516, to produce an intercharged exhaust charge, in an operation 866.

In an operation 868, the intercharged exhaust charge is injected to the inlet of a turbine 518. The intercharged exhaust charge is expanded by the turbine 518 to atmospheric pressure, in an operation 870. Expanding the intercharged exhaust charge causes the turbine 518 to rotate. The rotating turbine rotates the driveshaft 519 to drive the compressor 610 and a generator (not shown). Rotating the compressor 610 compresses the intake air as described above. Rotating the generator generates electrical power. The expanded intercharged exhaust charge is then expelled through the first heat exchanger 420 to the atmosphere, in an operation 872 and the electrical power is output to the power grid 150 in an operation 874, and the method operations can end. A TS graph of the turbine cycle of the enhanced CAES-intercharger system 800 is discussed in more detail in FIG. 14 below.

Figure 9A:
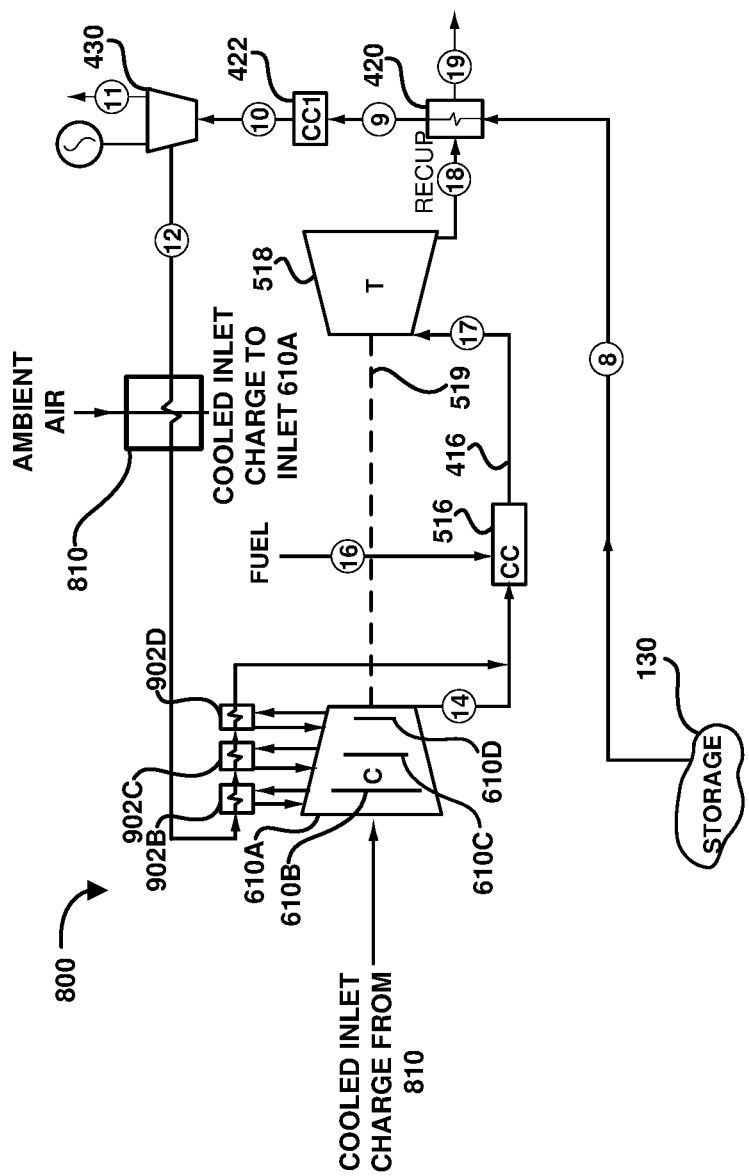
FIG. 9A is a CAES-intercooled (IC)-AI system, for implementing embodiments of the present disclosure
Figure 9B:
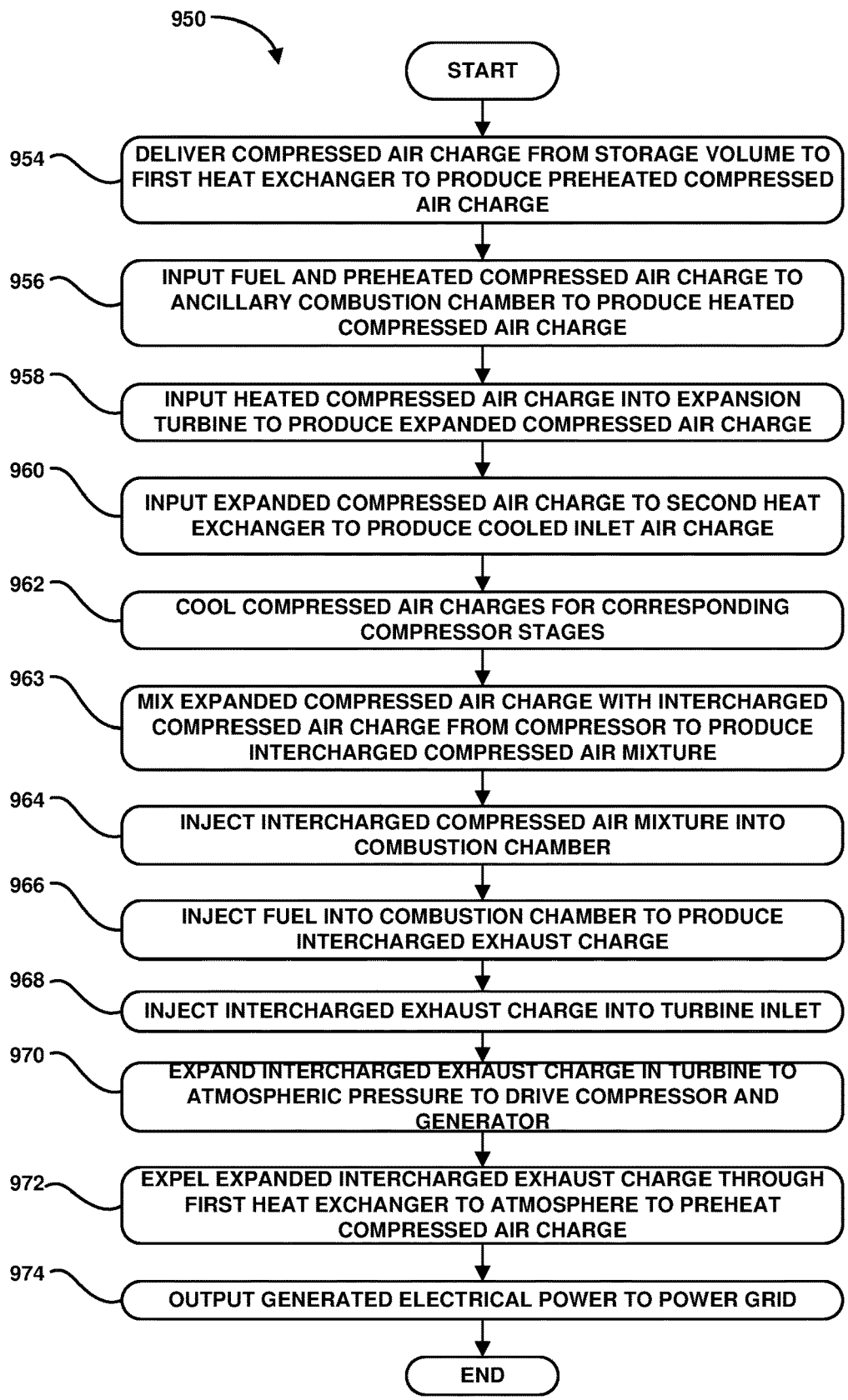
FIG. 9B is a flowchart diagram that illustrates the method operations 950 performed in operating the CAES-IC-AI system 900, for implementing embodiments of the present disclosure.

FIG. 9A is a CAES-intercooled (IC)-AI system 900, for implementing embodiments of the present disclosure. FIG. 9B is a flowchart diagram that illustrates the method operations 950 performed in operating the CAES-IC-AI system 800, for implementing embodiments of the present disclosure. The CAES-IC-AI system 900 is similar to the CAES-intercharger-AI system 800, however the expanded compressed air charge is passed through one or more intercoolers 902B, 902C, 902D to cool the compressed charge from one or more of the respective compressor stages 610B, 610C, 610D.

Referring again to FIG. 9B, in an operation 954, a compressed air charge from the storage volume 130 is delivered to a first heat exchanger 420 to produce preheated compressed air charge. The exhaust gases output from the turbine 518 are used to preheat the compressed air charge in the heat exchanger 420. The preheated the compressed air charge and a corresponding quantity of fuel are input to an ancillary combustion chamber 422 to produce a heated compressed air charge, in an operation 856.

In an operation 958, the heated compressed air charge is input to expansion turbine 430 to produce an expanded compressed air charge. The expanded compressed air charge is input to a second heat exchanger 810 to produce a cooled inlet air charge that is then delivered to the inlet 610A of the compressor 610, in an operation 960.

In an operation 962, the expanded, compressed air charge is delivered to and passes through the one or more heat exchangers 902B, 902C, 902D that correspond to compressor stages 610B, 610C, 610D, respectively. The heat exchangers 902B, 902C, 902D cool respective portions of the compressed air charge from each of the compressor stages 610B, 610C, 610D, respectively. The cooled compressed air charges from each of the heat exchangers 902B, 902C, 902D is then injected back into the compressor 610.

In an operation 963, the expanded, compressed air charge passes through the heat exchangers 902B, 902C, 902D and is then mixed with the intercharged compressed air charge output from the compressor 610 at the corresponding pressure and flow rate needed to produce an intercharged compressed air mixture. The intercharged compressed air mixture has a pressure of between about 5 bar and about 30 bar.

The intercharged compressed air mixture is injected into the combustion chamber 516 in an operation 964. A corresponding quantity of fuel is injected into the combustion chamber 516, to produce an intercharged exhaust charge, in an operation 966.

In an operation 968, the intercharged exhaust charge is injected to the inlet of a turbine 518. The intercharged exhaust charge is expanded by the turbine 518 to atmospheric pressure, in an operation 970. Expanding the intercharged exhaust charge causes the turbine 518 to rotate. The rotating turbine rotates the driveshaft 519 to drive the compressor 610 and a generator (not shown). Rotating the compressor 610 compresses the intake air as described above. Rotating the generator generates electrical power. The expanded intercharged exhaust charge is then expelled through the first heat exchanger 420 to the atmosphere, in an operation 972 and the electrical power is output to the power grid 150 in an operation 974, and the method operations can end. A TS graph of the turbine cycle of the enhanced CAES-intercharger system 800 is discussed in more detail in FIG. 15 below.

A case study of an exemplary gas turbine system is provided to illustrate example implementations of each of the CAES systems 500, 600, 700, 800, 900 described above. The case study presents the relative advantage of each of the CAES systems 500, 600, 700, 800, 900. The case study uses a General Electric LM5000 aero-derivative power plant as it is a commonly used gas turbine for generating electrical power.

The main goal of the original CAES plants was taking advantage of daytime electrical rate variations that exist in certain markets. For example, if in a given market a CAES compressor could run at nighttime, when the cost of electrical power is relatively low, then, during daytime when the cost of electrical power is sufficiently higher to justify the CAES system's use, the compressed air could drive a dedicated expansion turbine to produce power at a rate. Today, a main demand of new CAES systems is the increasing market penetration of renewable energy production, primarily wind and solar. It is believed that more than 30 percent of grid power production will be produced by wind and solar plants. The electrical power utility companies' ability to modulate power production so that load and contingency reserves are met will work only if the wind/solar forecasts are perfect, an untenable long term business situation, made worse as the grid make-up exceeds the 30 percent threshold. California is committed to providing 30 percent of California electrical power needs through renewable sources by 2020, and 50 percent of California electrical power demands by 2030. As a result, the need for immediate energy storage solutions is pressing. Finding suitable locations for large scale CAES systems on the U.S. mainland should not be a problem, as it is reported that appropriate geology such as porous media, hardrock, salt or caverns, is available in 85 percent of the United States. And while the proposed CAES systems 500, 600, 700, 800, 900 are suitable for mainland CAES system applications, with underground temperatures typically around 10-20° C., the pre-cooling and intercooling advantages described above are markedly improved with offshore wind farms, where ocean temperatures at storage depth are closer to 5° C. for most of the west coast of North America. Offshore windfarms are expected to represent a significantly growth sector in utilities in the coming decades in the United States. Offshore windfarms offer certain unique advantages to diabatic CAES systems, not readily available to similar land-based facilities. The advantages include:

Simple, well-regulated high pressure storage underwater, either in caverns or man-made storage reservoirs.

Man-made reservoirs can be as simple as anchored canopies with a single axis load path, simpler than other pressure vessels (e.g., large storage tanks such as pressurized gas bottles and similar pressure vessels).

The ocean provides a large thermal reservoir, for intercooling offshore compressors.

Natural cooling of pipe conduits to the storage reservoir, eliminating the needs for additional heat exchanger systems.

For the sake of the analysis of the CAES systems 500, 600, 700, 800, 900 a storage volume 130 can be approximately at least 300 meters deep, providing approximately 30 bars or more, with a temperature of approximately 5 degrees C. This storage volume 130 is coupled to a gas turbine power generating plant, located on land at an economically viable location, with ambient temperature significantly above that of the storage volume. By way of example, a typical ambient temperature is about 25 degrees C. or more is significantly above the 5 degrees or less temperature of the storage volume 130.

Figure 9C:
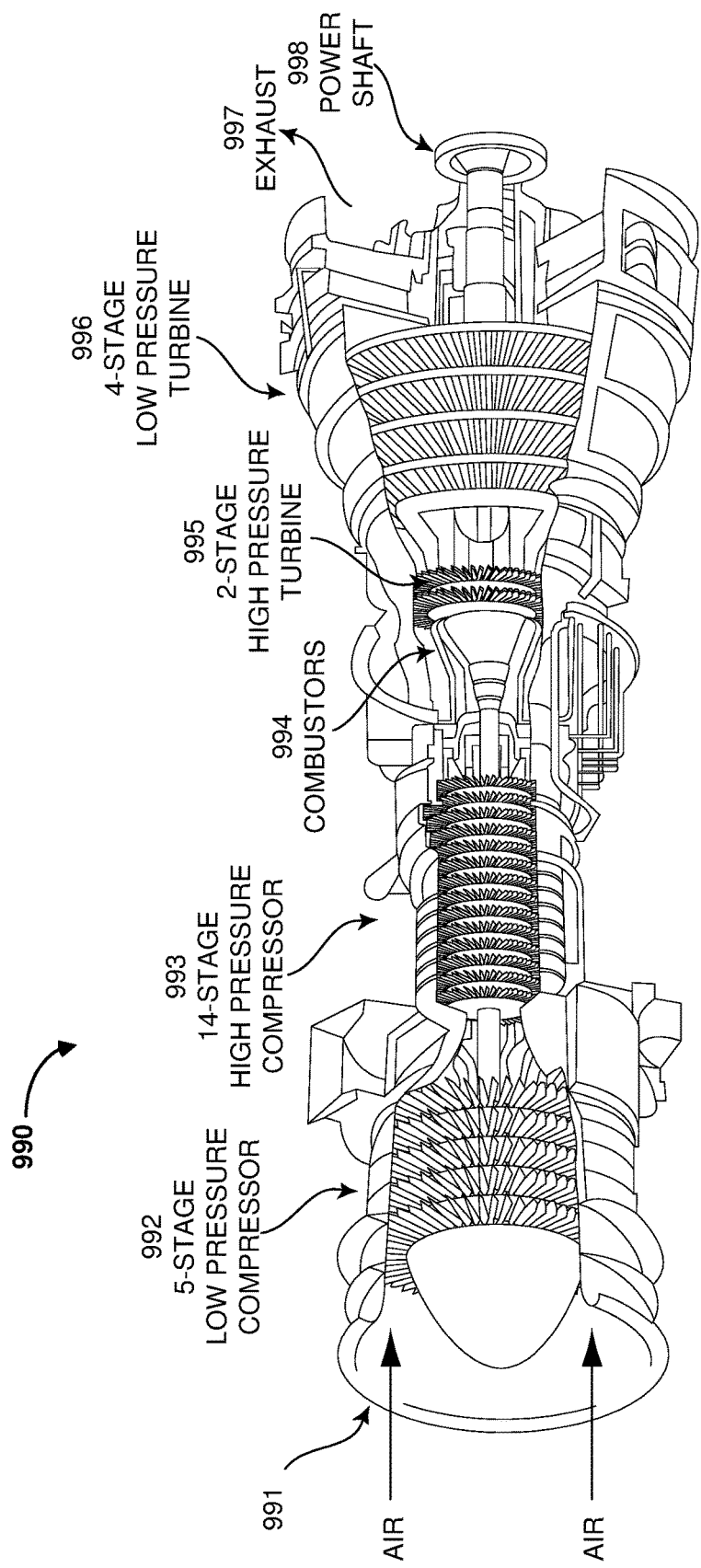
FIG. 9C illustrates a widely used industrial gas turbine LM5000.

One approach to reducing the cost of power plants is to leverage the original development cost by modifying existing gas turbines designed for other purposes, instead of designing dedicated gas turbines for power production. Aero-derivative power plants are an example of this practice. General Electric CF6-series of engines are used, for example, on the Airbus A300, Douglas DC-10, Boeing B747 and many others. FIG. 9C illustrates a widely used industrial gas turbine LM5000 990. The CF6 engines gave way to the widely used industrial gas turbine LM5000. The CF6-derived GE LM5000 industrial gas turbine, along with the LM2500 and LM6000 of the same family. The LM5000 gas turbine includes an air intake 991 feeding a 5 stage low pressure compressor section 992. The low pressure compressor section 904 feeds into a 14 stage high pressure compressor section 993. Combustors 994 receive the high pressure air from the high pressure compressor section 993. Fuel is also injected into the combustors 994 to generate still higher pressure and higher temperature exhaust gas. The higher temperature and higher pressure exhaust gas is injected into a 2 stage high pressure turbine 995 that expands the higher temperature and higher pressure exhaust gas to convert a first portion of the heat and pressure to a first portion of mechanical energy and output slightly reduced temperature and slightly reduced pressure exhaust gas. The slightly reduced temperature and slightly reduced pressure exhaust gas is input to a 4 stage low pressure turbine section 996. The low pressure turbine section 996 further expands the slightly reduced temperature and slightly reduced pressure exhaust gas to atmospheric pressure (e.g., about 1 bar) and outputs the atmospheric pressure exhaust gas out the exhaust 997 to the atmosphere. Expanding the slightly reduced temperature and slightly reduced pressure exhaust gas to atmospheric pressure converts a second portion of the heat and pressure to second portion of mechanical energy. The first and second portions of mechanical energy are used to drive the compressor sections 992 and 993 and also provide power to an external power shaft 998 that can be coupled to an electrical power generator or other consumer of the mechanical energy. The LM5000 gas turbine was selected in this case study due to the widespread use in that hundreds of LM5000 gas turbines are deployed around the world, accumulating millions of hours of documented performance. Other factors include LM5000 long history of engineering modifications and upgrades and relatively low cost. A recent market search showed complete LM5000 gas turbines available for less than $2 M (USD). By comparison, the McIntosh CAES plant cost a reported $65 M (1991 USD), and Dresser-Rand (the equipment manufacturer for the McIntosh plant) recently presented plans to supply equipment for a new traditional diabatic CAES plant (317 MW) in western Texas, the first new proposed CAES plant in 25 years, for an estimated cost of $200 M (USD). The project has been indefinitely postponed, due to high cost. The need for cheaper alternatives to traditional CAES gas turbine cycles is clear and a proven industrial gas turbine, combined in a new CAES systems 500, 600, 700, 800, 900, may provide such an alternative.

The basic performance parameters of the LM5000 operating in a simple Brayton gas turbine cycle at a standard day of 15° C. and 1 bar, are summarized in Table 1. The reported performance associated with a turbine modification to include steam injection in the turbine stages of the gas turbine (STIG) is also included, as a comparison, to illustrate the design flexibility and history of re-engineering of the LM5000.

TABLE 1

| LM5000 Cycle | Pressure Ratio | Mass flow Rates, Turbine Only [kg/hr] | Thermal Cycle Efficiency [%] | Rated Power Output [MW] |
|---|---|---|---|---|
| Simple | 30:1 | 450,000 (air) | 37 | 33 |
| Steam Injection (STIG) | 30:1 | 519,000 (air) + 31,500 (HP steam) + 32,700 (LP steam) | 43 | 50 |

The procedure used to evaluate the performance of the CAES systems 500, 600, 700, 800, 900 described herein begin with the development of a thermodynamic model for the simple gas turbine cycle that matched the actual machine. The purpose of the thermodynamic model is to determine the relative advantage or disadvantage of different CAES gas turbine cycle configurations, versus a baseline simple cycle gas turbine, so that matching the exact working gas composition (e.g., products of combustion, water injection used for $NO_x$ abatement, etc.) is less important than to find a setup that matches the baseline performance, and then keep the basic parameters constant throughout each iteration. "Ideal gas air" and its properties, as defined by Lemmon et al. was chosen as the working fluid in all cases. For the purposes of all analyses presented here ambient conditions surrounding the power generation plant were defined as $T_\infty=20°$ C. and $P_\infty=1$ bar.

The modeling environment used to perform the analysis consisted of the Engineering Equations Solver (EES) developed by F-Chart (http://fchart.com/ees/). This environment provides an ideal platform for this type of research, as the cycle characteristics can be programmed directly along with associated thermodynamic gas property lookup, and solved implicitly with minimal algorithm development, in a simple modular approach. If individual component performance maps became available, the individual component performance maps could easily be integrated into the programming environment to account for off-design performance. Since the individual component performance maps were not available at the time of this analysis, both the compressor and turbine were modeled with constant isentropic efficiencies of 90% and 85%, respectively, representative operating points for industrial gas turbines such as these. The combustor was assumed isobaric.

For the CAES systems 500, 600, 700, 800, 900, the analysis assumes that an infinite reservoir of air at 5° C. and arbitrary pressure is available to the gas turbine. The work required to produce this reservoir is not included in the analysis and thus the "cycle efficiencies" presented only refer to the gas turbine cycle itself.

Figure 10:
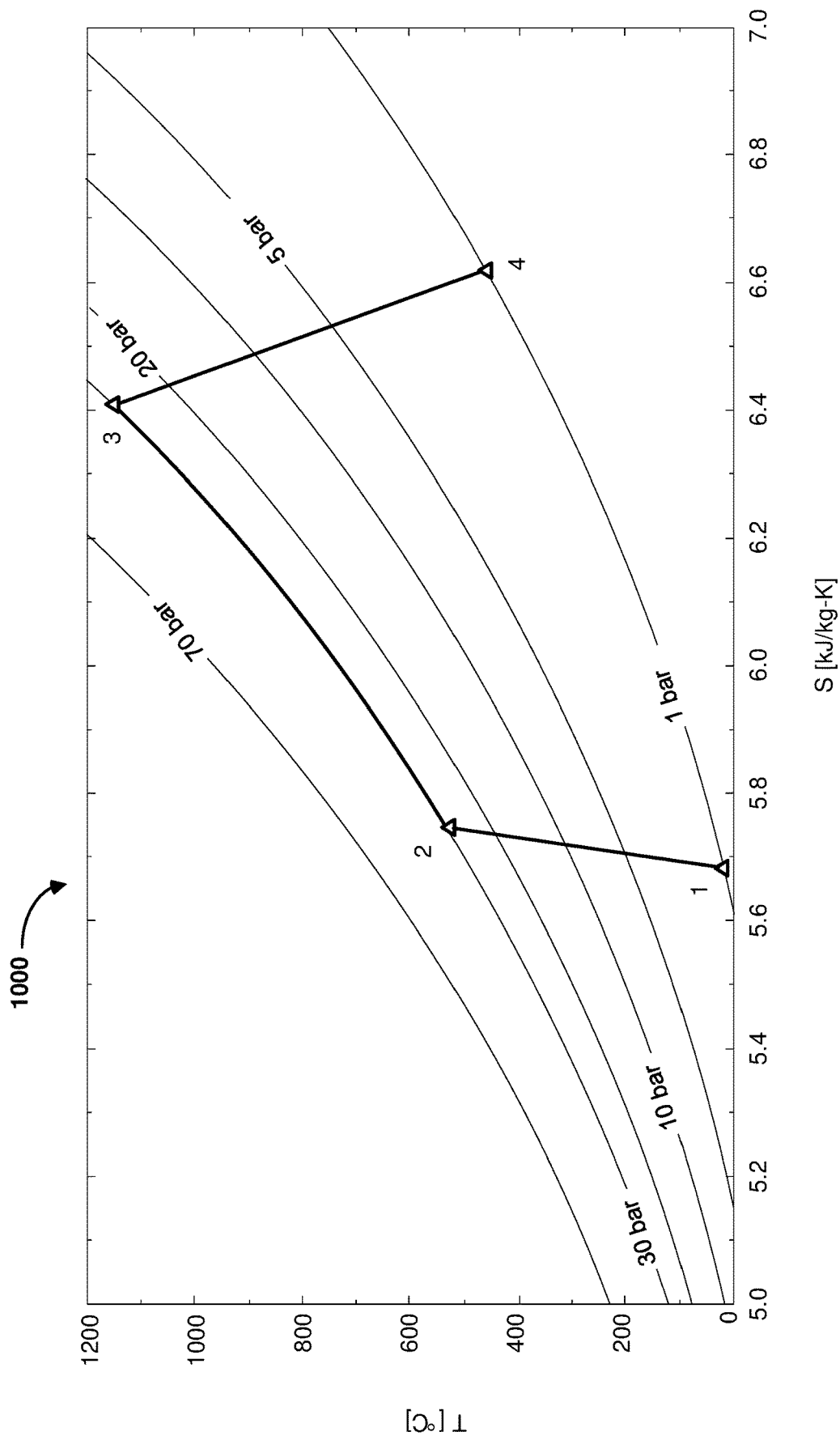
FIG. 10 is a TS graph of the baseline performance of the LM5000 under baseline conditions, operating in a simple cycle, for implementing embodiments of the present disclosure.

FIG. 10 is a TS graph 1000 of the baseline performance of the LM5000 under baseline conditions, operating in a simple cycle, for implementing embodiments of the present disclosure. The compressor and turbine efficiencies are 90% and 85%, respectively. Turbine inlet temperature (TIT) is set at the LM5000 design point of 1150 degrees C. The cycle thus defined matches the manufacturer's baseline specifications for thermal efficiency and power output. With the mass flow rate shown in Table 1, this cycle matches the reported performance of the machine, with a thermal efficiency of 37% and an output of 33 MW.

State points 1 and 2 represent the inlet and outlet of the compressor, respectively. State points 3 and 4 represent the inlet and outlet of the turbine, respectively. The temperature at state 3 is the turbine inlet temperature and is an important design point for a gas turbine. For the LM5000, the temperature at state 3 1150 degrees C. The turbine inlet temperature value remains constant for the analysis presented here.

This first proposed modification of the simple gas turbine cycle, described as the CAES-supercharger system 500, shown in FIG. 5A, above, uses the cool, pressurized CAES air for two specific benefits:

Naturally pre-cooled inlet, reducing compressor work at all ambient temperatures above that of the reservoir.

Significantly reduced pressure ratio across the compressor compared to that of the turbine, increasing the net work output to the generator.

Figure 11:
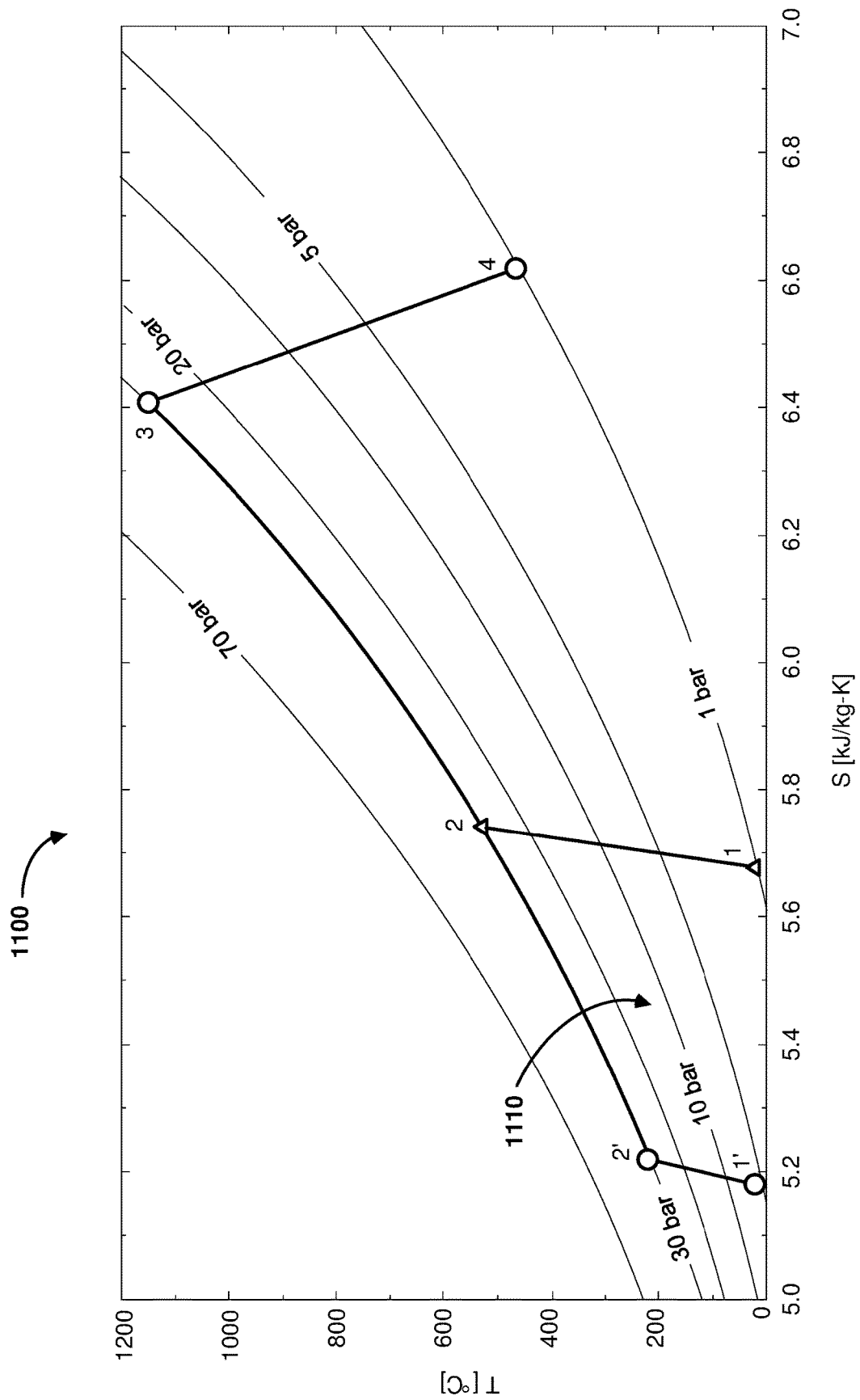
FIG. 11 is a TS graph of the performance of the LM5000 under CAES-supercharger system gas turbine cycle, for implementing embodiments of the present disclosure.

The CAES-supercharger system 500 gas turbine cycle includes the limitation that it subjects the entire low pressure gas turbine spool to a forward thrust for which it was not originally designed, and which may make it unsuitable for many industrial gas turbines, or at least require potentially re-engineering of the shaft support. The inlet cowling is now also pressurized, and thus requires consideration. However, given that the CF6 turbine was originally designed to operate with a rearward thrust on the main spool of around 185,000 N (41,500 $lb_f$), and that some residual thrust necessarily exists on the gas generator spool (with a free power turbine at least), reversed thrust may provide some cancellation benefit, and reduce bearing friction. Without specific mechanical data on the gas turbine spools design (not available at the time of writing), it is not possible to evaluate how much reversed thrust is acceptable on the LM5000. For the sake of illustration, the CAES-supercharger system 500 gas turbine cycle is run with a supercharge of 5 bars at the inlet (meaning that the pressure of the compressed air charge delivered from the CAES storage volume 130 is throttled down to this pressure by the pressure regulating device 502). FIG. 11 is a TS graph 1100 of the performance of the LM5000 under CAES-supercharger system 500 gas turbine cycle, for implementing embodiments of the present disclosure. The new cycle 1100 is overlaid onto the original LM5000 cycle 1000, and shows the reduced compressor work. State points 1 and 2 represent the inlet and outlet of the compressor, respectively, in the baseline LM5000 cycle 1000. State points 3 and 4 represent the inlet and outlet of the turbine, respectively, in the baseline LM5000 cycle 1000. State point 1' represents the lower inlet temperature and higher pressure (e.g. about 5 bar as compared to 1 bar of state point 1) of the pressurized compressor inlet of the CAES-supercharger system 500. State point 2' represents the lower compressor outlet temperature at about the same pressure of about 30 bar of the compressor in the CAES-supercharger system 500. The lower temperature, higher pressure area 1110 illustrates the improved efficiency of the CAES-supercharger system 500 as compared to the baseline LM5000 cycle 1000.

Despite the clear exergy losses associated with throttling the storage volume 130 pressure to such a low pressure, this proposed change improves the LM5000 performance dramatically. The gas turbine cycle efficiency improves to 55.9 percent, and the net power output available to the generator increases to 73 MW, more than twice that of the original machine, and nearly 50 percent higher than the STIG modification commonly used, without the long lag time penalties associated with all combined cycles and steam injector cycles that require boilers. However, it should be noted that in the CAES-supercharger system 500 gas turbine cycle there is no ambient make-up air. The entire gas turbine mass flow of inlet air is supplied by the CAES storage volume 130.

The CAES-intercharger system 600 builds on the CAES-supercharger system 500 by avoiding pressurizing the entire compressor intake, reducing exergy loss and reducing the CAES air mass flow rate by using ambient air intake and thus enabling operation for the same duration as CAES-Supercharger, with a smaller CAES storage volume 130.

Figure 12:
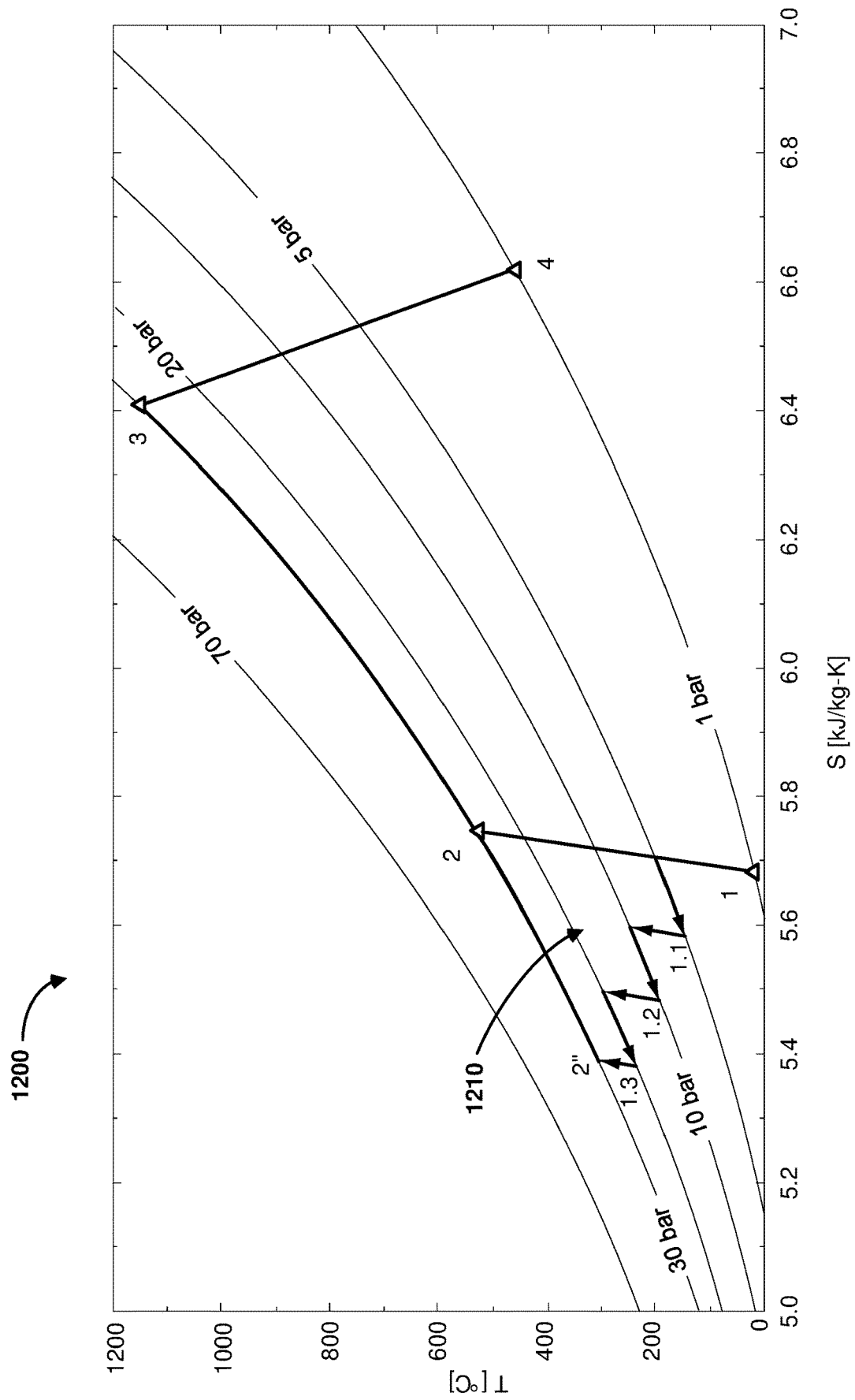
FIG. 12 is a TS graph of the performance of the LM5000 under CAES-intercharger system gas turbine cycle, for implementing embodiments of the present disclosure.

The CAES-intercharger system 600 injects CAES air directly into one or more stages of the compressor, boosting the post-stage mass flow and intercooling the compressor stage prior to the next compressor stage. FIG. 12 is a TS graph 1200 of the performance of the LM5000 under CAES-intercharger system 600 gas turbine cycle, for implementing embodiments of the present disclosure. The graph 1200 includes three example compressor stage points of injection 1.1, 1.2, 1.3. The LM5000 has 19 compressor stages or 18 available cooled, intercharge injection points. The net work across the compressor 610 may still be reduced, while the overall mass flow rate has increased. By comparison, the CAES-AI system 400, where the low temperature of the injected flow does not assist the compressor and creates an additional fuel energy load to reach the same turbine inlet temperature, compared to an equivalent, non-injected cycle, FIG. 4A. The net cycle benefit of the CAES-intercharger system 600 is similar to that of CAES-supercharger system 500, with a reduced CAES mass flow rate. State points 1 and 2 represent the inlet and outlet of the compressor, respectively, in the baseline LM5000 cycle 1000. State points 3 and 4 represent the inlet and outlet of the turbine, respectively, in the baseline LM5000 cycle 1000. State point 1.1 represents the lower temperature and pressure of the first compressor stage into which the CAES air charge is injected in the CAES-intercharger system 600. State point 1.2 represents the lower temperature and pressure of the second compressor stage into which the CAES air charge is injected in the CAES-intercharger system 600. State point 1.3 represents the lower temperature and pressure of the third compressor stage into which the CAES air charge is injected in the CAES-intercharger system 600. State point 2' represents the lower compressor outlet temperature at about the same pressure of about 30 bar of the compressor in the CAES-intercharger system 600. The lower temperature, higher pressure area 1210 illustrates the improved efficiency of the CAES-intercharger system 600, as compared to the baseline LM5000 cycle 1000.

The CAES-gas turbine augmented system 700 is a further improvement on CAES-intercharger system 600, with a single injection port at the compressor outlet, see FIG. 7A. Two other components required, heat exchangers 705, 730, do not directly impact the operation of the gas turbine, but directly improve its performance. The compressed air charge from the CAES storage volume 130 is passed through the first heat exchanger 705 and acts as a pre-cooler to the compressor 710, while pre-heating the compressed air charge from the CAES storage volume.

A second heat exchanger 730, across the turbine exhaust flow, further heats the compressed air charge from the CAES storage volume 130, which is then injected (at a pressure slightly above compressor outlet) directly into the combustion chamber 618. The entire system exergy is maximized if the CAES storage volume 130 pressure matches closely the compressor outlet pressure, such as, around 30 bars for a system built around the LM5000.

Note that the CAES-gas turbine augmented system 700 cycle allows the gas turbine to operate in standalone mode at any time as well, and benefits from any level of airflow from the CAES storage volume 130. Gas turbine start times and shutdown times remain identical as the simple gas turbine cycle.

The performance of the CAES-gas turbine augmented system 700 system by assuming that two heat exchangers are available on the LM5000, each with effectiveness of 80 percent. The baseline operating point assumes that the CAES air input equals that of the simple gas turbine operation as a basis for comparison with CAES-supercharger system 500. Assuming an unmodified gas turbine operating at the same pressure ratio and turbine inlet temperature, as the simple cycle, this means that the flow speed through each turbine stage doubles (affecting swirl angles through each stage) and thus this scenario may well be beyond the range of operation of this turbine. Still, with the same mass flow rate from the CAES storage volume 130, the CAES-gas turbine augmented system 700 presents a clear basis for comparison with CAES-supercharger system 500.

Figure 13:
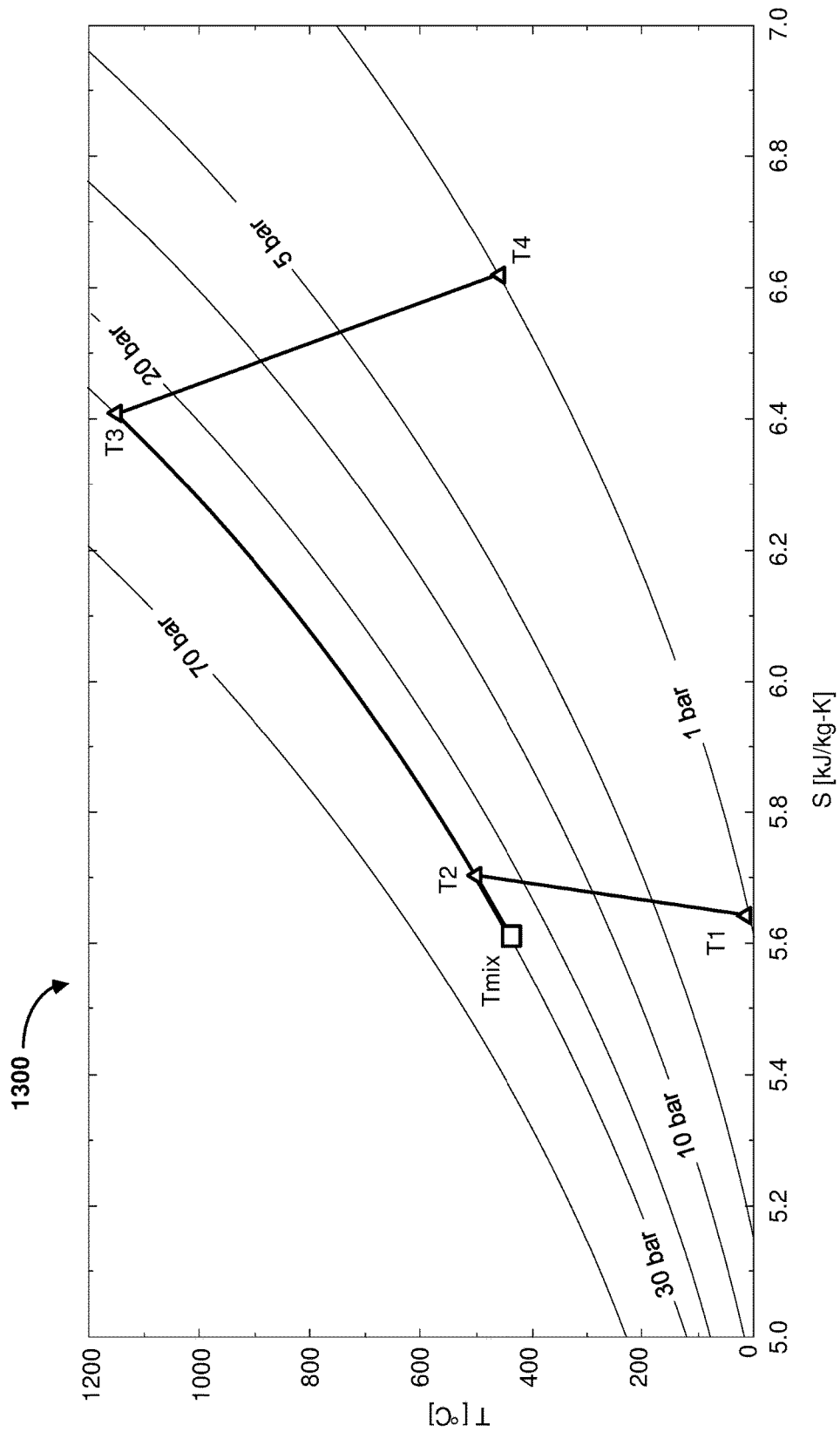
FIG. 13 is a TS graph of the performance of the LM5000 under the CAES-gas turbine augmented system gas turbine cycle, for implementing embodiments of the present disclosure.

FIG. 13 is a TS graph 1300 of the performance of the LM5000 under the CAES-gas turbine augmented system 700 gas turbine cycle, for implementing embodiments of the present disclosure. The CAES-gas turbine augmented system 700 cycles optimizes the match between a CAES storage volume 130 and the target turbine. The compressor inlet is precooled and the compressor inlet temp ($T_1$) is now at 8 degrees C., for an ambient temperature of 20 degrees C. The compressor outlet temperature ($T_2$) is at 498 degrees C. is mixed with the CAES air now at 370 degrees C., after regenerative heating in the second heat exchanger 730 with the turbine exhaust temperature ($T_4$) at 457 degrees C. in a 1-to-1 mass flow ratio through the second heat exchanger, in this example implementation. The result is a doubling of the mass flow rate of the simple cycle into the combustion chamber 618 and an average temperature before combustion of $T_{mix}=432°$ C. This 1-to-1 match between compressor mass flow and CAES mass flow produces a cycle that generates 136 MW of net power, or nearly double the output of the CAES-supercharger system 500 and four times the baseline turbine, with an efficiency of 65.9 percent, nearly twice that of the original system, for the same CAES intake flow as CAES-supercharger system.

Again, it is not suggested that an unmodified industrial gas turbine would be able to operate so far beyond its regular design point, but its performance will be improved regardless of the CAES mass fraction used. To illustrate this, the performance of the LM5000 on the CAES-gas turbine augmented system 700 cycle, at various levels of CAES fractional flowrates, is summarized in Table 2 and compared to the CAES-intercharger-air injection (AI) system 800 and the CAES-intercooled (IC)-AI system 900. The efficiency of the gas turbine thus matches that of the STIG modified LM5000 with a CAES mass flow rate of 10 percent. The power output at that point is below that of the STIG turbine, and suggests that the effects of this modification on the operation of the gas turbine are acceptable.

TABLE 2

| CAES Mass Fraction | Thermal Cycle Efficiency of the CAES-gas turbine augmented system | Net Power Output [MW] | Both CAES-intercharger-air injection (AI) system 800 and CAES-intercooled (IC)-AI system 900 | |
|---|---|---|---|---|
| | | | Gas Turbine Thermal Cycle Efficiency % | Gas Turbine Net Power Output [MW] |
| 5 percent | 40.2 | 38.4 | 40-60 | 38-45 |
| 10 percent | 42.9 | 43.6 | 42-65 | 43-52 |
| 25 percent | 49.5 | 58.9 | 49-70 | 58-70 |
| 50 percent | 57.1 | 84.5 | 57-80 | 84-100 |
| 100 percent | 65.9 | 135.6 | 65-85 | 135-162 |

Figure 14:
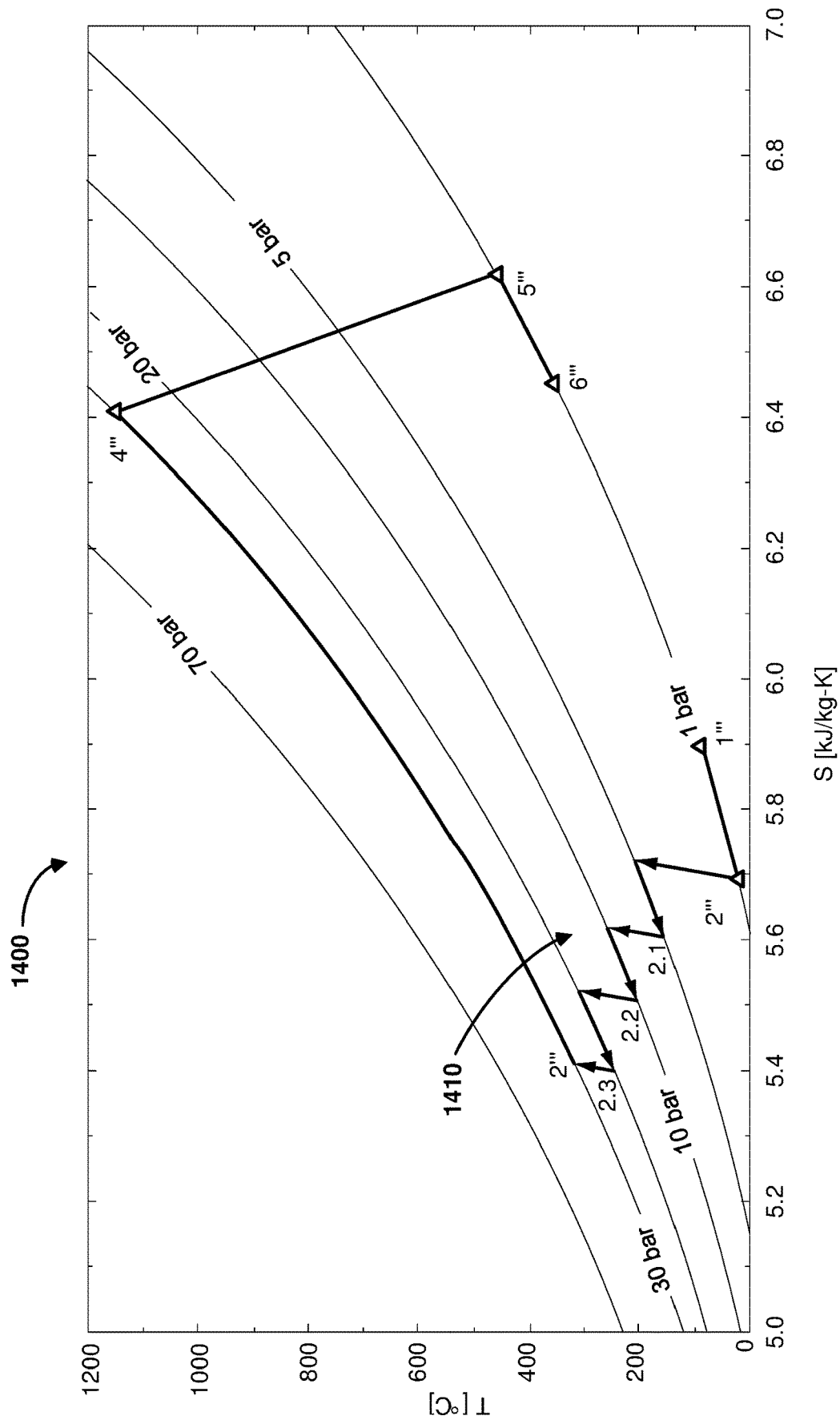
FIG. 14 is a TS graph of the performance of the LM5000 under the CAES-intercharger-AI system shown in FIG. 8A, augmented system gas turbine cycle for implementing embodiments of the present disclosure.

FIG. 14 is a TS graph of the performance of the LM5000 under the CAES-intercharger-AI system 800 shown in FIG. 8A, augmented system gas turbine cycle for implementing embodiments of the present disclosure. State point 1''' represents the starting temperature of the inlet air before being cooled in the heat exchanger 810. State point 2''' represents the inlet temperature of the compressor of the CAESintercharger-AI system 800. State point 2.1 represents the lower temperature and pressure of the first compressor stage which the CAES air charge cools portions of the compressed air of the first compressor stage and then injected in the CAES-intercharger-AI system 800. State point 2.2 represents the lower temperature and pressure of the first compressor stage which the CAES air charge cools portions of the compressed air of the second compressor stage and then injected in the CAES-intercharger-AI system 800. State point 2.3 represents the lower temperature and pressure of the first compressor stage which the CAES air charge cools portions of the compressed air of the third compressor stage and then injected in the CAES-intercharger-AI system 800. State point 3''' represents the lower compressor outlet temperature at about the same pressure of about 30 bar of the compressor in the CAES-intercharger-AI system 800. State points 4''' and 5''' represent the inlet and outlet of the turbine, respectively, in the CAES-intercharger-AI system 800. The lower temperature, higher pressure area 1410 illustrates the improved efficiency of the CAES-intercharger-AI system 800, as compared to the baseline LM5000 cycle 1000.

Figure 15:
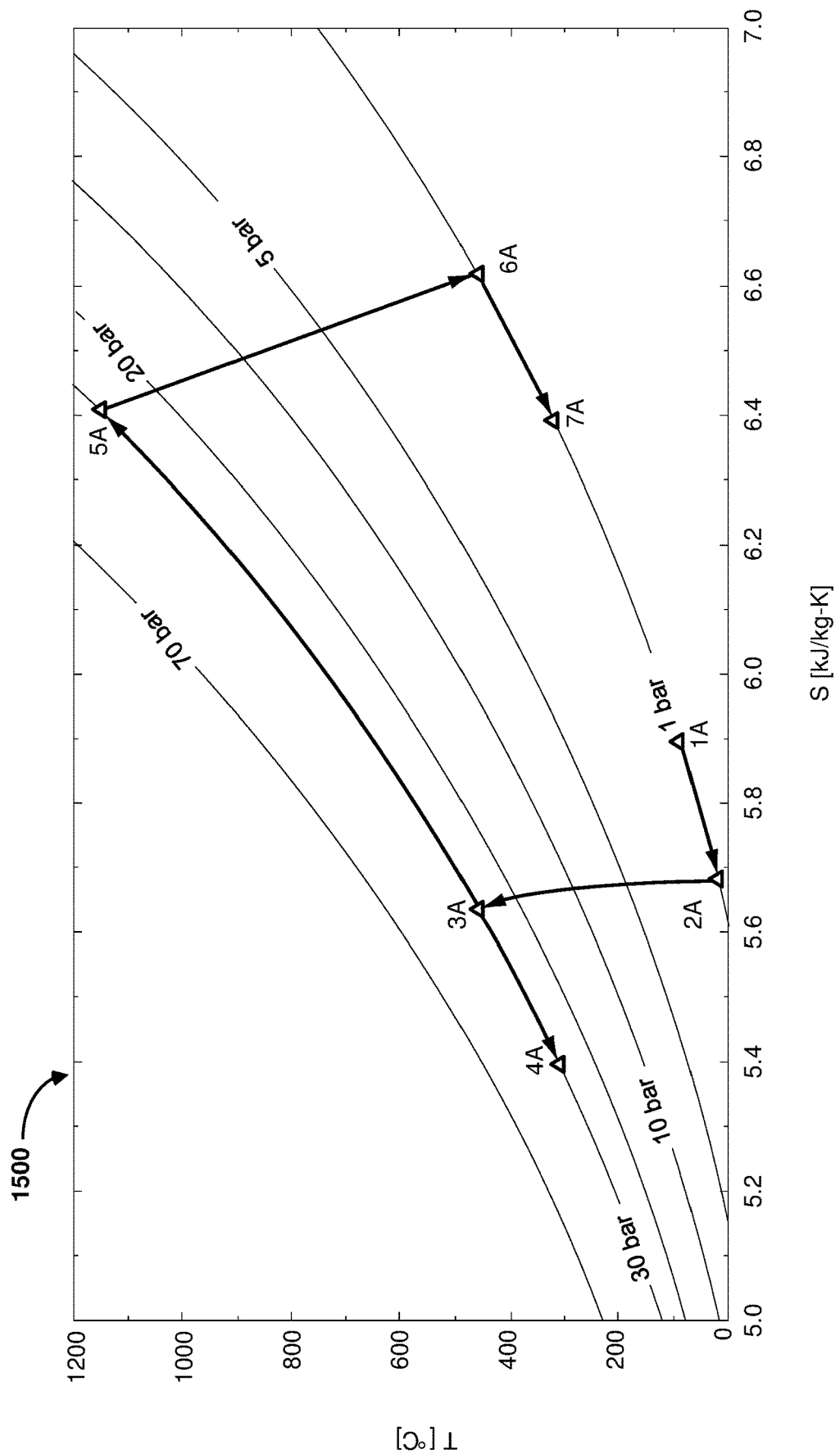
FIG. 15 is a TS graph of the performance of the LM5000 under the CAES-IC-AI system shown in FIG. 9A augmented system gas turbine cycle, for implementing embodiments of the present disclosure.

FIG. 15 is a TS graph of the performance of the LM5000 under the CAES-IC-AI system 900 shown in FIG. 9A augmented system gas turbine cycle, for implementing embodiments of the present disclosure. State point 1A represents the starting temperature of the inlet air before being cooled in the heat exchanger 810. State point 2A represents the inlet temperature and pressure of the compressor of the CAES-IC-AI system 900. State point 4A represents the lower compressor outlet temperature at about the same pressure of about 30 bar of the compressor in the CAES-IC-AI system 900. State points 5A and 6A represent the inlet and outlet temperatures and pressures of the turbine, respectively, in the CAES-IC-AI system 900. State point 7A represents the outlet temperature and pressure turbine exhaust charge after being cooled in the heat exchanger 420.

The simple gas turbine cycle continues to represent one of the best means of power generation at a time when integration with renewable energy sources becomes paramount, because of its flexibility and rapid ramp up and cool down. Combining this platform with energy storage in the form of CAES, for the purpose of boosting the efficiency of the gas turbine cycle, is one way to rapidly implement CAES on a larger scale without large development cost, and to cope with an ever increasing fraction of renewable energy in the mix. Four new gas turbine cycles using CAES to enhance the efficiency and output of a standard gas turbine engine, show how it is possible to dramatically improve its performance. A pragmatic approach to power production, allowing diabatic CAES to contribute today, is one method to rapidly reduce carbon emissions at a relatively lower cost than traditional CAES.

It will be further appreciated that the instructions represented by the operations in the above figures are not required to be performed in the order illustrated, and that all the processing represented by the operations may not be necessary to practice the disclosure. Although the foregoing disclosure has been described in some detail for purposes of clarity of understanding, it will be apparent that certain changes and modifications may be practiced within the scope of the appended claims. Accordingly, the present embodiments are to be considered as illustrative and not restrictive, and the disclosure is not to be limited to the details given herein, but may be modified within the scope and equivalents of the appended claims.

What is claimed is:

1. A method of delivering a cooling air charge to a gas turbine system comprising:
    delivering a stored compressed air charge from a storage volume to a first heat exchanger, wherein the stored compressed air charge has a stored compressed air charge temperature less than an ambient temperature and a stored compressed air charge mass, wherein the stored compressed air charge temperature is 5 degrees C.;
    delivering an inlet air charge from ambient atmosphere to the first heat exchanger, the inlet air charge having an inlet air charge temperature equal to the ambient temperature, wherein the inlet air charge has an inlet air charge mass at least 10 times the stored compressed air charge mass;
    transferring heat from the air inlet charge to the stored compressed air charge in the first heat exchanger to produce a cooled inlet air charge and a warmed delivered compressed air charge from the first heat exchanger;
    compressing the cooled inlet air charge in a compressor to produce a second compressed air charge, the second compressed air charge having a second compressed air temperature and a compressor output pressure;
    heating the warmed delivered compressed air charge in a second heat exchanger to output a heated compressed air charge, the heated compressed air charge having a heated compressed air charge temperature and a heated compressed air charge pressure, wherein the heated compressed air charge pressure is greater than the compressor output pressure;
    regulating a flow rate of the heated compressed air charge in a flow regulating device, the flow regulating device having an output coupled to a mixer;
    inputting the second compressed air charge and the heated compressed air charge into the mixer to produce a mixer output charge wherein the heated compressed air charge temperature is less than the second compressed air charge temperature and the mixer output charge having a mixer output charge temperature less than the second compressed air charge temperature;
    injecting the mixer output charge and a corresponding fuel charge into a combustion chamber to heat the mixer output charge and produce a corresponding exhaust charge;
    inputting the exhaust charge to a turbine inlet of a turbine;
    expanding the exhaust charge in the turbine, wherein expanding the exhaust charge in the turbine drives the compressor and a generator and produces an expanded exhaust charge, the expanded exhaust charge input to the second heat exchanger.

2. The method of claim 1, wherein the compressor including a compressor inlet, a plurality of compressor stages, at least one compressor shaft mechanically coupling the plurality of compressor stages and a compressor outlet;
    the combustion chamber including a fuel inlet, a combustion chamber outlet and a combustion chamber inlet fluidly coupled to the compressor outlet; and
    the turbine including a turbine inlet fluidly coupled to the combustion chamber outlet, a plurality of turbine stages and a turbine shaft mechanically coupling each one of the plurality of turbine stages and the compressor shaft and a turbine outlet.

3. The method of claim 1, wherein the first heat exchanger includes a first heat exchanger inlet coupled to a stored compressed air charge inlet line and a second heat exchanger inlet coupled to an inlet air source for providing the inlet air charge, the first heat exchanger operable to transfer heat from the inlet air charge to the stored compressed air charge from the stored compressed air charge inlet line, the first heat exchanger including a cooled inlet air charge outlet coupled to the inlet of the compressor.

4. The method of claim 1, wherein the heated compressed air charge having a temperature between 150 degrees C. and 400 degrees C. and a pressure drop across the second heat exchanger of between 0 and 5 percent.

5. The method of claim 1, wherein a mixer output is coupled to an input of the combustion chamber.

6. A method of cooling a gas turbine system inlet air charge comprising:
   transferring heat from an inlet air charge to a portion of a stored, compressed air charge to produce a cooled inlet air charge and a warmed delivered compressed air charge, wherein a mass of the portion of a stored, compressed air charge about 10 percent of an inlet air charge mass;
   compressing the cooled inlet air charge in a compressor to produce a second compressed air charge, the second compressed air charge having a second compressed air temperature and a compressor output pressure;
   heating the warmed delivered compressed air charge in a heat exchanger to output a heated compressed air charge, the heated compressed air charge having a heated compressed air charge temperature and a heated compressed air charge pressure, wherein the heated compressed air charge pressure is greater than the compressor output pressure;
   regulating a flow rate of the heated compressed air charge;
   mixing the second compressed air charge and the heated compressed air charge in a mixer to produce a mixer output charge, wherein the heated compressed air charge temperature is less than the second compressed air charge temperature and the mixer output charge having a mixer output charge temperature less than the second compressed air charge temperature;
   heating the mixer output charge and a corresponding fuel charge in a combustion chamber to produce an exhaust charge;
   expanding the exhaust charge in the turbine, wherein expanding the exhaust charge in the turbine drives the compressor and a generator and outputs an expanded exhaust charge, the expanded exhaust charge input to the heat exchanger to transfer heat from the expanded exhaust charge to the warmed delivered compressed air charge.

* * * * *